(12) United States Patent
Yoo et al.

(10) Patent No.: US 12,032,819 B2
(45) Date of Patent: Jul. 9, 2024

(54) ELECTRONIC DEVICE FOR PERFORMING FUNCTION MATCHED WITH GRAPHIC AFFORDANCE AND OPERATING METHOD OF ELECTRONIC DEVICE

(71) Applicant: SAMSUNG ELECTRONICS CO., LTD., Suwon-si (KR)

(72) Inventors: Hyunwoo Yoo, Suwon-si (KR); Sangwon Shim, Suwon-si (KR); Eunji Ahn, Suwon-si (KR); Jaemyoung Lee, Suwon-si (KR); Minkoo Kang, Suwon-si (KR); Changkeun Kim, Suwon-si (KR); Donggun Park, Suwon-si (KR); Woonggi Shin, Suwon-si (KR); Younghak Oh, Suwon-si (KR); Yonggu Lee, Suwon-si (KR); Eunah Jang, Suwon-si (KR); Jungwoo Choi, Suwon-si (KR); Yong Kwon, Suwon-si (KR); Hyejin Sim, Suwon-si (KR); Seockhyun Yu, Suwon-si (KR); Heekyung Jeon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/885,947

(22) Filed: Aug. 11, 2022

(65) Prior Publication Data
US 2023/0069151 A1 Mar. 2, 2023

Related U.S. Application Data

(63) Continuation of application No. PCT/KR2022/007531, filed on May 27, 2022.

(30) Foreign Application Priority Data
Aug. 31, 2021 (KR) .................. 10-2021-0115356

(51) Int. Cl.
*G06F 3/048* (2013.01)
*G06F 3/0481* (2022.01)
(Continued)

(52) U.S. Cl.
CPC .......... *G06F 3/0488* (2013.01); *G06F 3/0481* (2013.01); *G06F 3/04845* (2013.01); *G06F 3/04847* (2013.01)

(58) Field of Classification Search
CPC .. G06F 3/0488; G06F 3/0481; G06F 3/04845; G06F 3/04847; G06F 3/04817;
(Continued)

(56) References Cited

U.S. PATENT DOCUMENTS 9,195,368 B2   11/2015  Kuscher et al.
10,691,298 B2 *  6/2020  Zhang ................. G06F 3/04883
(Continued)

FOREIGN PATENT DOCUMENTS

CN        106020590 A  * 10/2016  ........... G06F 3/0481
KR    1020100053811 A     5/2010
(Continued)

OTHER PUBLICATIONS

International Search Report issued on Aug. 26, 2022 for the corresponding International Patent Application No. PCT/KR2022/007531.

*Primary Examiner* — Rashawn N Tillery
(74) *Attorney, Agent, or Firm* — Sughrue Mion, PLLC

(57) ABSTRACT

An electronic device is provided. The electronic device includes: a touch display; and a processor configured to: control the touch display to display a first graphic affordance; control the display to replace, based on an input indicating the first graphic affordance, display of the first graphic affordance with a second graphic affordance; control the display to deform the second graphic affordance accord- (Continued)

ing to an action of a user while the input is maintained; and execute a function matched to the first graphic affordance based on a moving distance of the input and whether the input is maintained.

11 Claims, 18 Drawing Sheets

(51) Int. Cl.
  *G06F 3/04845* (2022.01)
  *G06F 3/04847* (2022.01)
  *G06F 3/0488* (2022.01)
(58) Field of Classification Search
  CPC .. G06F 3/0482; G06F 3/0483; G06F 3/04886; G06F 3/04883
  See application file for complete search history.

(56) References Cited

U.S. PATENT DOCUMENTS

| | | | |
|---|---|---|---|
| 10,983,624 | B2 | 4/2021 | Xu et al. |
| 2013/0141362 | A1* | 6/2013 | Asanuma ............ G06F 3/04845 345/173 |
| 2013/0198682 | A1* | 8/2013 | Matas ................. G06F 3/04845 715/784 |
| 2015/0212692 | A1* | 7/2015 | Hyun .................... G06F 3/0488 715/719 |
| 2015/0347010 | A1* | 12/2015 | Yang ................... G06F 3/04892 715/765 |
| 2016/0042166 | A1* | 2/2016 | Kang .................. G06F 3/04886 726/7 |
| 2016/0048316 | A1* | 2/2016 | Bae ........................ H04M 1/724 715/781 |
| 2016/0070460 | A1* | 3/2016 | Gradert .................... H04N 1/00 715/771 |
| 2017/0090714 | A1* | 3/2017 | Lee ...................... G06F 3/04883 |
| 2018/0173383 | A1* | 6/2018 | Jisrawi ................... H04L 51/046 |
| 2020/0393957 | A1* | 12/2020 | Wilson .................... G06F 1/163 |

FOREIGN PATENT DOCUMENTS

| | | |
|---|---|---|
| KR | 10-2013-0028573 A | 3/2013 |
| KR | 101416992 B1 | 7/2014 |
| KR | 1020150089813 A | 8/2015 |
| KR | 10-1608673 B1 | 4/2016 |
| KR | 101844978 B1 | 4/2018 |
| KR | 10-2018-0112626 A | 10/2018 |
| KR | 1020190136061 A | 12/2019 |

* cited by examiner

600

| Function | 40% ~ 50% | 51% ~ 60% | 61% ~ 70% |
|---|---|---|---|
| Flashlight | Brightness Level 1 | Brightness Level 3 | Brightness Level 5 |
| Do Not Disturb | Until I turn it off | For 1 hour | During bedtime |
| Phone | Answer call | Change to mute | Decline call |
| Timer | Alarm in 10 min | Alarm in 30 mins | Alarm in 1 hour |
| Camera | Run camera | Immediately take picture | Immediately record video |
| Weather | Today's weather | Tomorrow's weather | This week's weather |
| Voice Record | Run app | Start/end voice recording ||
| Bixby | Run app | Run Bixby listening ||

FIG.6

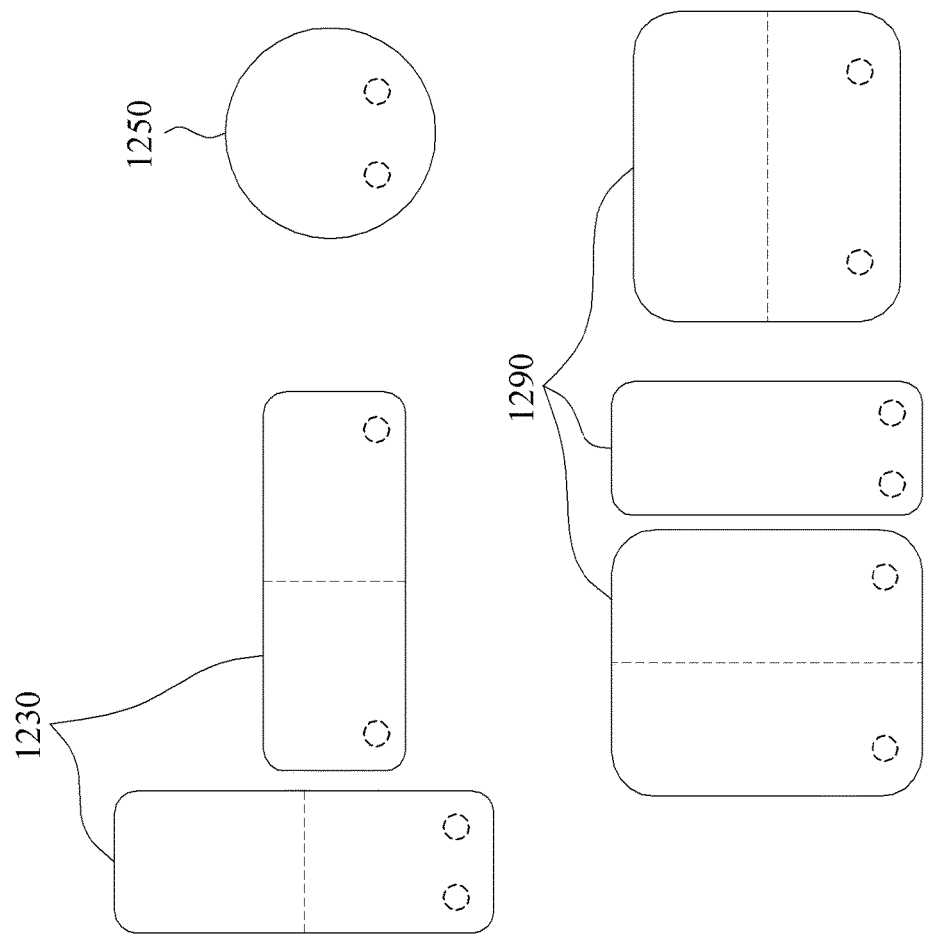
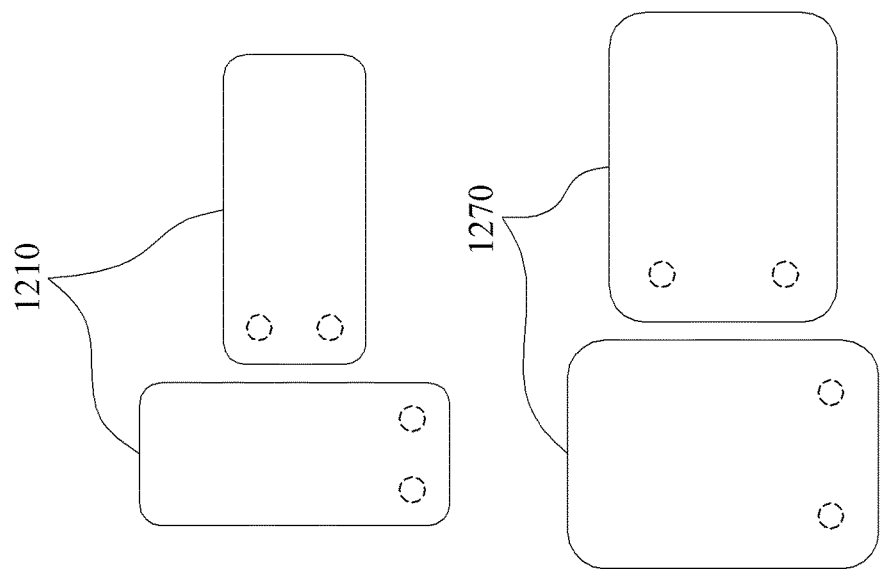
FIG.12

ELECTRONIC DEVICE FOR PERFORMING FUNCTION MATCHED WITH GRAPHIC AFFORDANCE AND OPERATING METHOD OF ELECTRONIC DEVICE

CROSS-REFERENCE TO RELATED APPLICATIONS

This application is a continuation application of International Application No. PCT/KR2022/007531, filed on May 27, 2022, in the Korean Intellectual Property Receiving Office, which is based on and claims priority to Korean Patent Application No. 10-2021-0115356, filed on Aug. 31, 2021, in the Korean Intellectual Property Office, the disclosures of which are incorporated by reference herein in their entireties.

BACKGROUND

1. Field

The disclosure relates to an electronic device for performing a function matched with a graphic affordance and an operating method of the electronic device.

2. Description of Related Art

With the development of display technology, various types of expandable displays are being developed, and various functions may be performed through user interactions with graphic affordances displayed on a display. User interactions with various graphic affordances may trigger execution of functions matched to the graphic affordances.

SUMMARY

In accordance with an aspect of the disclosure, an electronic device, includes: a touch display; and a processor configured to: control the touch display to display a first graphic affordance; control the display to replace, based on an input indicating the first graphic affordance, display of the first graphic affordance with a second graphic affordance; control the display to deform the second graphic affordance according to an action of a user while the input is maintained; and execute a function matched to the first graphic affordance based on a moving distance of the input and whether the input is maintained.

The processor may be further configured to compare the moving distance with a first threshold, and execute the function matched to the first graphic affordance based on the moving distance exceeding the first threshold, and the input being released.

The processor may be further configured to: control the display to maintain display of the second graphic affordance while the moving distance is less than the first threshold and the input is maintained; control the display to return to displaying the first graphic affordance based on the moving distance being less than the first threshold and the input being released; control the display to change the second graphic affordance based on the moving distance being greater than or equal to the first threshold and the input being maintained; and execute the function matched to the first graphic affordance based on the moving distance being greater than or equal to the first threshold and the input being released.

The processor may be further configured to control the display to change the second graphic affordance: by visually deforming the second graphic affordance; by adding, to the second graphic affordance, at least one of an expression and an icon guiding the function matched to the first graphic affordance; by adding, to the second graphic affordance, an acoustic affordance including at least one of a sound and haptics related to the function matched to the first graphic affordance; or by displaying a preview screen corresponding to the function matched to the first graphic affordance over the second graphic affordance.

The processor may be further configured to, based on the moving distance being greater than or equal to the first threshold and the input being maintained, perform the function corresponding to the first graphic affordance while modifying the function according to a degree to which the moving distance exceeds a second threshold, while continuing to control the display to change the second graphic affordance.

The processor may be further configured to control the display to replace, based on a number of functions matched to the first graphic affordance, the first graphic affordance with one or more graphic affordances corresponding to the functions, respectively.

The processor may be further configured to: control the display to replace the first graphic affordance with the second graphic affordance based on one function being matched to the first graphic affordance; control the display to replace the first graphic affordance with the second graphic affordance and a third graphic affordance that respectively correspond to two functions, based on the two functions being matched to the first graphic affordance; and control the display to replace the first graphic affordance with the second graphic affordance, the third graphic affordance, and a fourth graphic affordance that respectively correspond to three functions, based on the three functions being matched to the first graphic affordance.

The processor may be further configured to execute a detailed function matched to each of the one or more graphic affordances based on the moving distance, distances respectively corresponding to the one or more graphic affordances, a moving direction of the input, and whether the input is maintained.

The processor may be further configured to execute, based on a first function and a second function being matched to the first graphic affordance, a detailed function matched to the second graphic affordance or a third graphic affordance based on the moving distance, the distances respectively corresponding to the second graphic affordance and the third graphic affordance, and whether the input is maintained.

The processor may be further configured to: execute a detailed function matched to the second graphic affordance based on the moving distance corresponding to the second graphic affordance and exceeding the second threshold, and execute a detailed function matched to a third graphic affordance based on the moving distance corresponding to the third graphic affordance and exceeding the second threshold.

In accordance with an aspect of the disclosure, an operating method of an electronic device includes: receiving an input indicating a first graphic affordance displayed on a touch display of the electronic device; replacing, based on the input, the first graphic affordance with a second graphic affordance; deforming the second graphic affordance according to an action of a user while the input is maintained; and executing a function matched to the first graphic affordance based on a moving distance of the input and whether the input is maintained.

The operating may further include comparing the moving distance with a first threshold. The executing of the function matched to the first graphic affordance may include executing the function matched to the first graphic affordance based on the moving distance exceeding the first threshold, and the input being released.

The executing of the function matched to the first graphic affordance may include at least one of: maintaining display of the second graphic affordance while the moving distance is less than the first threshold and the input is maintained; returning to display of the first graphic affordance based on the moving distance being less than the first threshold and the input being released; changing the second graphic affordance based on the moving distance being greater than or equal to the first threshold and the input being maintained; and executing the function matched to the first graphic affordance based on the moving distance being greater than or equal to the first threshold and the input being released.

The changing of the second graphic affordance may include at least one of: visually deforming the second graphic affordance; adding, to the second graphic affordance, at least one of an expression and an icon guiding the function matched to the first graphic affordance; adding, to the second graphic affordance, an acoustic affordance including at least one of a sound and haptics related to the function matched to the first graphic affordance; and displaying a preview screen corresponding to the function matched to the first graphic affordance over the second graphic affordance.

The changing of the second graphic affordance may further include, based on the moving distance being greater than or equal to the first threshold and the input being maintained, performing the function corresponding to the first graphic affordance while modifying the function according to a degree to which the moving distance exceeds a second threshold, while changing the second graphic affordance.

The replacing with the second graphic affordance may include replacing, based on a number of functions matched to the first graphic affordance, the first graphic affordance with one or more graphic affordances corresponding to the functions, respectively.

The replacing with as many graphic affordances as the functions may include at least one of: replacing the first graphic affordance with the second graphic affordance based on one function being matched to the first graphic affordance; replacing the first graphic affordance with the second graphic affordance and a third graphic affordance that respectively correspond to two functions, based on the two functions being matched to the first graphic affordance; and replacing the first graphic affordance with the second graphic affordance, the third graphic affordance, and a fourth graphic affordance that respectively correspond to three functions, based on the three functions being matched to the first graphic affordance.

The executing of the function matched to the first graphic affordance may include executing a detailed function matched to each of the one or more graphic affordances based on the moving distance, distances respectively corresponding to the one or more graphic affordances, a moving direction of the input, and whether the input is maintained.

The executing of the detailed function matched to the one or more graphic affordances may include executing, based on a first function and a second function being matched to the first graphic affordance, a detailed function matched to the second graphic affordance or a third graphic affordance based on the moving distance, the distances respectively corresponding to the second graphic affordance and the third graphic affordance and whether the input is maintained.

In accordance with an aspect of the disclosure, a non-transitory computer-readable storage medium stores instructions that, when executed by a processor of an electronic device, cause the electronic device to perform an operating method including: receiving an input indicating a first graphic affordance displayed on a touch display of the electronic device; replacing, based on the input, the first graphic affordance with a second graphic affordance; deforming the second graphic affordance according to an action of a user while the input is maintained; and executing a function matched to the first graphic affordance based on a moving distance of the input and whether the input is maintained.

In accordance with an aspect of the disclosure, an electronic device includes: a touch display; and a processor configured to: control the touch display to display a first initial graphic affordance corresponding to a first function adjacent a first edge of the touch display and a second initial graphic affordance corresponding to a second function adjacent a second edge of the touch display; identify whether an input received via the touch display indicates the first initial graphic affordance or the second initial graphic affordance; control the touch display to display a first subsequent graphic affordance corresponding to the first function along the first edge of the touch display based on the input indicating the first initial graphic affordance; and control the touch display to display a second subsequent graphic affordance corresponding to the second function along the second edge of the touch display based on the input indicating the second initial graphic affordance.

The processor may be further configured to control the touch display to maintain display of the first subsequent graphic affordance or the second subsequent graphic affordance while the input is maintained.

The processor may be further configured to control the touch display to change where the first subsequent graphic affordance or the second subsequent graphic affordance is displayed according to movement of the input while the input is maintained.

The processor may be further configured to identify, based on the input being released, whether a difference between a touch start point of the input and a touch end point of the input exceeds a threshold distance.

The processor may be further configured to execute the first function based on the input being released, the input corresponding to the first initial graphic affordance, and the difference exceeding the threshold distance.

The processor may be further configured to execute the second function based on the input being released, the input corresponding to the second initial graphic affordance, and the difference exceeding the threshold distance.

The processor may be further configured to control the touch display to display the first initial graphic affordance adjacent the first edge and the second initial graphic affordance adjacent the second edge based on the input being released and the difference not exceeding the threshold distance.

The processor may be further configured to: identify whether a difference between a touch start point of the input and a current touch point of the input exceeds a threshold distance; and execute the first function while the input is maintained based on the input corresponding to the first initial graphic affordance, and the difference exceeding the threshold distance.

The processor may be further configured to execute the second function while the input is maintained based on the input corresponding to the second initial graphic affordance, and the difference exceeding the threshold distance.

BRIEF DESCRIPTION OF THE DRAWINGS

The above and other aspects, features, and advantages of certain embodiments of the present disclosure will be more apparent from the following description, taken in conjunction with the accompanying drawings, in which:

FIG. 6 is a table illustrating examples of functions matched to a first graphic affordance according to embodiments;

FIG. 12 is a diagram illustrating form factors according to embodiments;

DETAILED DESCRIPTION

Figure 1:
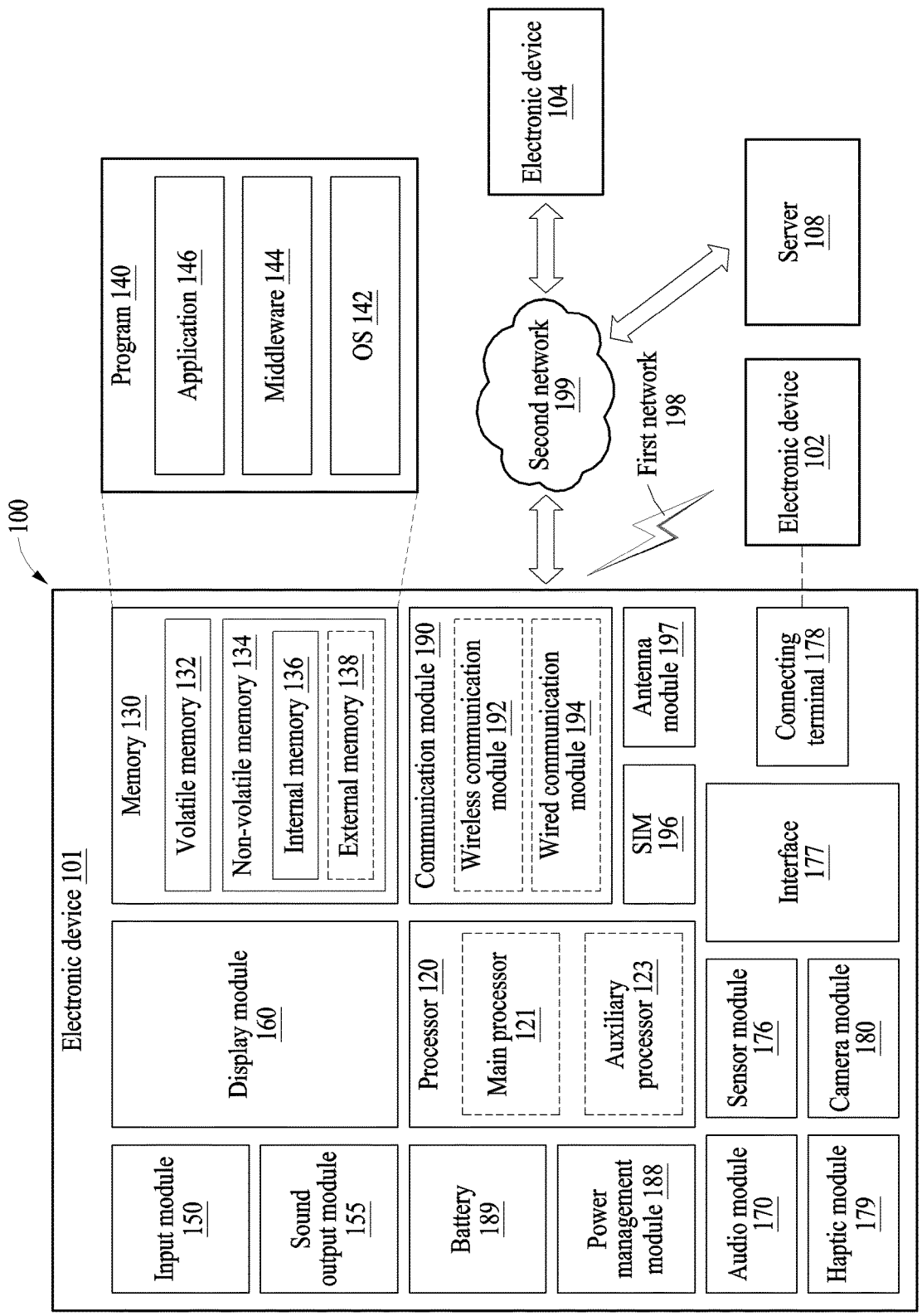
FIG. 1 is a block diagram illustrating an electronic device in a network environment according to embodiments.

Hereinafter, embodiments will be described in detail with reference to the accompanying drawings. Like reference numerals refer to like elements and a repeated description related thereto will be omitted.

FIG. 1 is a block diagram illustrating an electronic device 101 in a network environment 100 according to embodiments. Referring to FIG. 1, the electronic device 101 in the network environment 100 may communicate with an electronic device 102 via a first network 198 (e.g., a short-range wireless communication network), or communicate with at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, a memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. According to an embodiment, as at least a part of data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment, the processor 120 may include a main processor 121 (e.g., a central processing unit (CPU) or an application processor (AP)) or an auxiliary processor 123 (e.g., a graphics processing unit (GPU), a neural processing unit (NPU), an image signal processor (ISP), a sensor hub processor, or a communication processor (CP)) that is operable independently of, or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a portion of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to an embodiment, the auxiliary processor 123 (e.g., an ISP or a CP) may be implemented as a portion of another component (e.g., the camera module 180 or the communication module 190) that is functionally related to the auxiliary processor 123. According to an embodiment, the auxiliary processor 123 (e.g., an NPU) may include a hardware structure specified for artificial intelligence model processing. An artificial intelligence model may be generated by machine learning. Such learning may be performed by, for example, the electronic device 101 in which an artificial intelligence model is executed, or performed via a separate server (e.g., the server 108). Learning algorithms may include, but are not limited to, for example, supervised learning, unsupervised learning, semi-supervised learning, or reinforcement learning. The artificial intelligence model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The artificial intelligence model may additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The non-volatile memory 134 may include an internal memory 136 and an external memory 138.

The program 140 may be stored as software in the memory 130, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing record. The receiver may be used to receive an incoming call. According to an embodiment, the receiver may be implemented separately from the speaker or as a part of the speaker.

The display module 160 may visually provide information to the outside (e.g., a user) of the electronic device 101. The display module 160 may include, for example, a control circuit for controlling a display, a hologram device, or a projector and control circuitry to control a corresponding one of the display, the hologram device, and the projector. According to an embodiment, the display module 160 may include a touch sensor adapted to detect a touch, or a pressure sensor adapted to measure the intensity of force incurred by the touch.

The audio module 170 may convert a sound into an electrical signal or vice versa. According to an embodiment, the audio module 170 may obtain the sound via the input module 150 or output the sound via the sound output module 155 or an external electronic device (e.g., the electronic device 102 such as a speaker or a headphone) directly or wirelessly connected to the electronic device 101.

The sensor module 176 may detect an operational state (e.g., power or temperature) of the electronic device 101 or an environmental state (e.g., a state of a user) external to the electronic device 101, and generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or a fingerprint sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or an electrical stimulus which may be recognized by a user via his or her tactile sensation or kinesthetic sensation. According to an embodiment, the haptic module 179 may include, for example, a motor, a piezoelectric element, or an electric stimulator.

The camera module 180 may capture a still image and moving images. According to an embodiment, the camera module 180 may include one or more lenses, image sensors, image signal processors, or flashes.

The power management module 188 may manage power supplied to the electronic device 101. According to an embodiment, the power management module 188 may be implemented as, for example, at least a part of a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently of the processor 120 (e.g., an AP) and that support a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and a next-generation communication technology, e.g., a new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beam-forming, or a large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in a communication network, such as the first network 198 or the second network 199, may be set by, for example, the communication module 190 from the plurality of antennas. The signal or the power may be transmitted or received between the communication module 190 and the external electronic device via the at least one set antenna. According to an embodiment, another component (e.g., a radio frequency integrated circuit (RFIC)) other than the radiating element may be additionally formed as a part of the antenna module 197.

According to embodiments, the antenna module 197 may form a mmWave antenna module. According to an embodiment, the mmWave antenna module may include a PCB, an RFIC disposed on a first surface (e.g., a bottom surface) of the PCB or adjacent to the first surface and capable of supporting a designated a high-frequency band (e.g., the mmWave band), and a plurality of antennas (e.g., array antennas) disposed on a second surface (e.g., a top or a side surface) of the PCB, or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of the same type as or a different type from the electronic device 101.

According to an embodiment, all or some of operations to be executed by the electronic device 101 may be executed at one or more of the external electronic devices 102 and 104, and the server 108. For example, if the electronic device 101 needs to perform a function or a service automatically, or in response to a request from a user or another device, the electronic device 101, instead of, or in addition to, executing the function or the service, may request one or more external electronic devices to perform at least part of the function or the service. The one or more external electronic devices receiving the request may perform the at least portion of the function or the service requested, or an additional function or an additional service related to the request, and may transfer an outcome of the performing to the electronic device 101. The electronic device 101 may provide the outcome, with or without further processing of the outcome, as at least portion of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
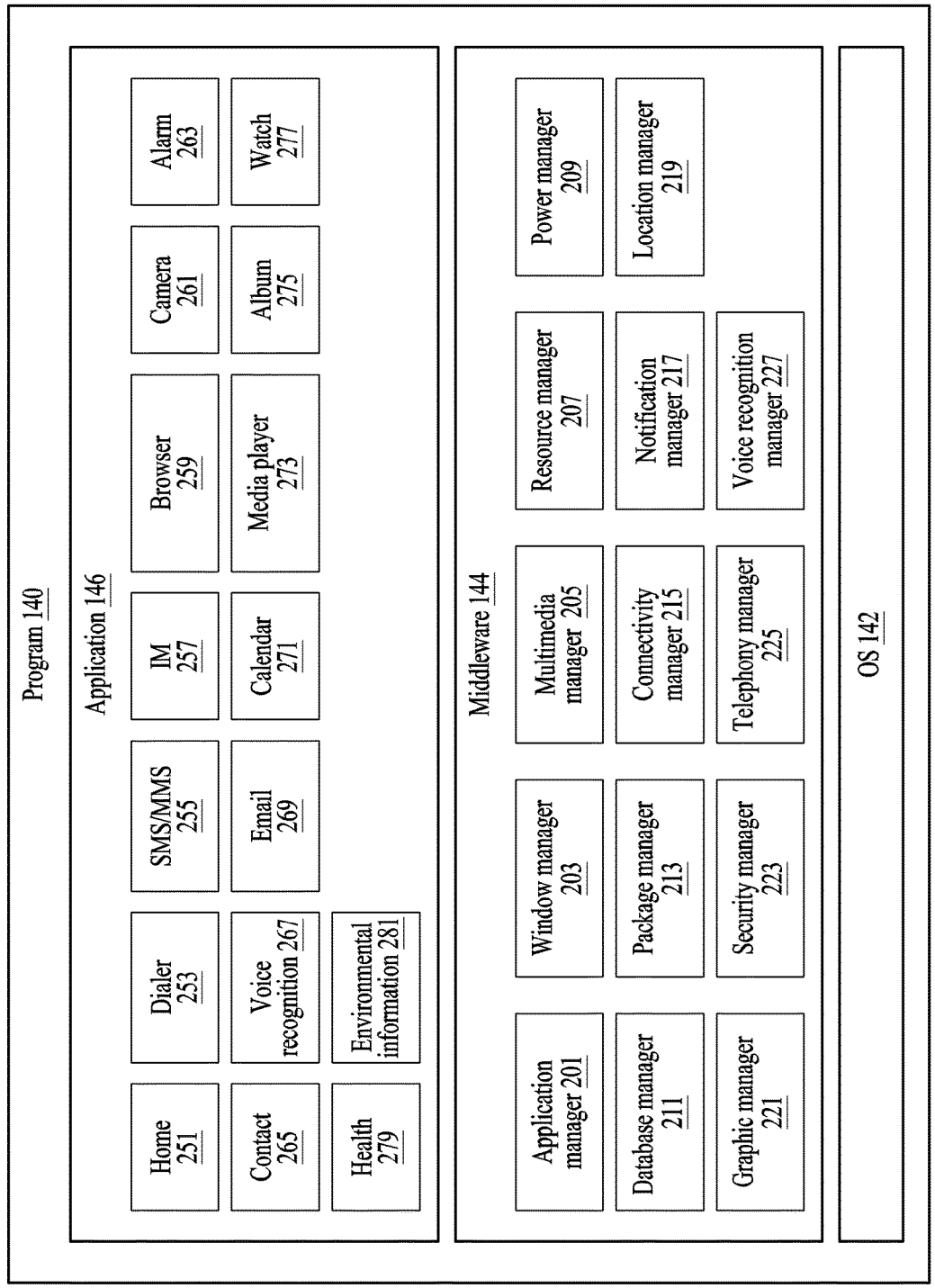
FIG. 2 is a block diagram illustrating a program according to embodiments.

FIG. 2 is a block diagram 200 illustrating a program 140 according to embodiments. According to an embodiment, the program 140 may include an OS 142 to control one or more resources of the electronic device 101, middleware 144, or an application 146 executable in the OS 142. The OS 142 may include, for example, Android™, iOS™ Windows™, Symbian™, Tizen™, or Bada™. At least part of the program 140, for example, may be pre-loaded on the electronic device 101 during manufacture, or may be downloaded from or updated by an external electronic device (e.g., the electronic device 102 or 104, or the server 108) during use by a user.

The OS 142 may control management (e.g., allocation or deallocation) of one or more system resources (e.g., a process, a memory, or a power source) of the electronic device 101. The OS 142 may additionally or alternatively include other one or more driver programs to drive other hardware devices of the electronic device 101, for example, the input module 150, the sound output module 155, the display module 160, the audio module 170, the sensor module 176, the interface 177, the haptic module 179, the camera module 180, the power management module 188, the battery 189, the communication module 190, the SIM 196, or the antenna module 197.

The middleware 144 may provide various functions to the application 146 such that a function or information provided from one or more resources of the electronic device 101 may be used by the application 146. The middleware 144 may include, for example, an application manager 201, a window manager 203, a multimedia manager 205, a resource manager 207, a power manager 209, a database manager 211, a package manager 213, a connectivity manager 215, a notification manager 217, a location manager 219, a graphic manager 221, a security manager 223, a telephony manager 225, or a voice recognition manager 227.

The application manager 201 may, for example, manage the life cycle of the application 146. The window manager 203, for example, may manage one or more graphical user interface (GUI) resources that are used on a screen. The multimedia manager 205, for example, may identify one or more formats to be used to play media files, and may encode or decode a corresponding one of the media files using a codec appropriate for a corresponding format selected from the one or more formats. The resource manager 207, for example, may manage the source code of the application 146 or a memory space of the memory 130. The power manager 209, for example, may manage the capacity, temperature, or power of the battery 189, and may determine or provide related information to be used for the operation of the electronic device 101 based on at least in part on corresponding information of the capacity, temperature, or power of the battery 189. According to an embodiment, the power manager 209 may interwork with a basic input/output system (BIOS) of the electronic device 101.

The database manager 211, for example, may generate, search, or change a database to be used by the application 146. The package manager 213, for example, may manage installation or update of an application that is distributed in the form of a package file. The connectivity manager 215, for example, may manage a wireless connection or a direct connection between the electronic device 101 and the external electronic device. The notification manager 217, for example, may provide a function to notify a user of an occurrence of a specified event (e.g., an incoming call, a message, or an alert). The location manager 219, for example, may manage location information on the electronic device 101. The graphic manager 221, for example, may manage one or more graphic effects to be offered to a user or a user interface related to the one or more graphic effects.

The security manager 223, for example, may provide system security or user authentication. The telephony manager 225, for example, may manage a voice call function or a video call function provided by the electronic device 101. The voice recognition manager 227, for example, may transmit user's voice data to the server 108, and may receive, from the server 108, a command corresponding to a function to be executed on the electronic device 101 based on at least in part on the voice data, or text data converted based on at least in part on the voice data. According to an embodiment, the middleware 144 may dynamically delete some existing components or add new components. According to an embodiment, at least part of the middleware 144 may be included as part of the OS 142 or may be implemented as another software separate from the OS 142.

The application 146 may include, for example, a home 251, dialer 253, short message service (SMS)/multimedia messaging service (MMS) 255, instant message (1M) 257, browser 259, camera 261, alarm 263, contact 265, voice recognition 267, email 269, calendar 271, media player 273, album 275, watch 277, health 279 (e.g., for measuring the degree of workout or biometric information, such as blood sugar), or environmental information 281 (e.g., for measuring air pressure, humidity, or temperature information) application. According to an embodiment, the application 146 may further include an information exchanging application that is capable of supporting information exchange between the electronic device 101 and the external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 269) of the electronic device 101 to the external electronic device. Additionally or alternatively, the notification relay application may receive notification information from the external electronic device and provide the notification information to a user of the electronic device 101.

The device management application may control a power source (e.g., turning on or off) or a function (e.g., brightness, resolution, or focus) of an external electronic device that communicates with the electronic device 101 or a portion of components of the external electronic device (e.g., a display module or a camera module). The device management application may additionally or alternatively support installation, deletion, or update of an application that operates in an external electronic device.

The electronic device according to embodiments may be one of various types of electronic devices. The electronic device may include, for example, a portable communication device (e.g., a smartphone), a computer device, a portable multimedia device, a portable medical device, a camera, a wearable device, or a home appliance device. According to an embodiment of the disclosure, the electronic device is not limited to those described above.

It should be appreciated that embodiments of the present disclosure and the terms used therein are not intended to limit the technological features set forth herein to particular embodiments and include various changes, equivalents, or replacements for a corresponding embodiment. In connection with the description of the drawings, like reference numerals may be used for similar or related components. It is to be understood that a singular form of a noun corresponding to an item may include one or more of the things, unless the relevant context clearly indicates otherwise. As used herein, "A or B", "at least one of A and B", "at least one of A or B", "A, B or C", "at least one of A, B and C", and "A, B, or C," each of which may include any one of the items listed together in the corresponding one of the phrases, or all possible combinations thereof. For example, the expression, "at least one of A, B and C," should be understood as including only A, only B, only C, both A and B, both A and C, both B and C, or all of A, B, and C. Terms such as "first", "second", or "first" or "second" may simply be used to distinguish the component from other components in question, and do not limit the components in other aspects (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Embodiments as set forth herein may be implemented as software (e.g., the program 140) including one or more instructions that are stored in a storage medium (e.g., the internal memory 136 or the external memory 138) that is readable by a machine (e.g., the electronic device 101 of FIG. 1). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Here, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to embodiments, each component (e.g., a module or a program) of the above-described components may include a single entity or multiple entities, and some of the multiple entities may be separately disposed in different components. According to embodiments, one or more of the above-described components or operations may be omitted, or one or more other components or operations may be added. Alternatively or additionally, a plurality of components (e.g., modules or programs) may be integrated into a single component. In such a case, according to embodiments, the integrated component may still perform one or more functions of each of the plurality of components in the same or similar manner as they are performed by a corresponding one of the plurality of components before the integration. According to embodiments, operations performed by the module, the program, or another component may be carried out sequentially, in parallel, repeatedly, or heuristically, or one or more of the operations may be executed in a different order or omitted, or one or more other operations may be added.

Figure 3:
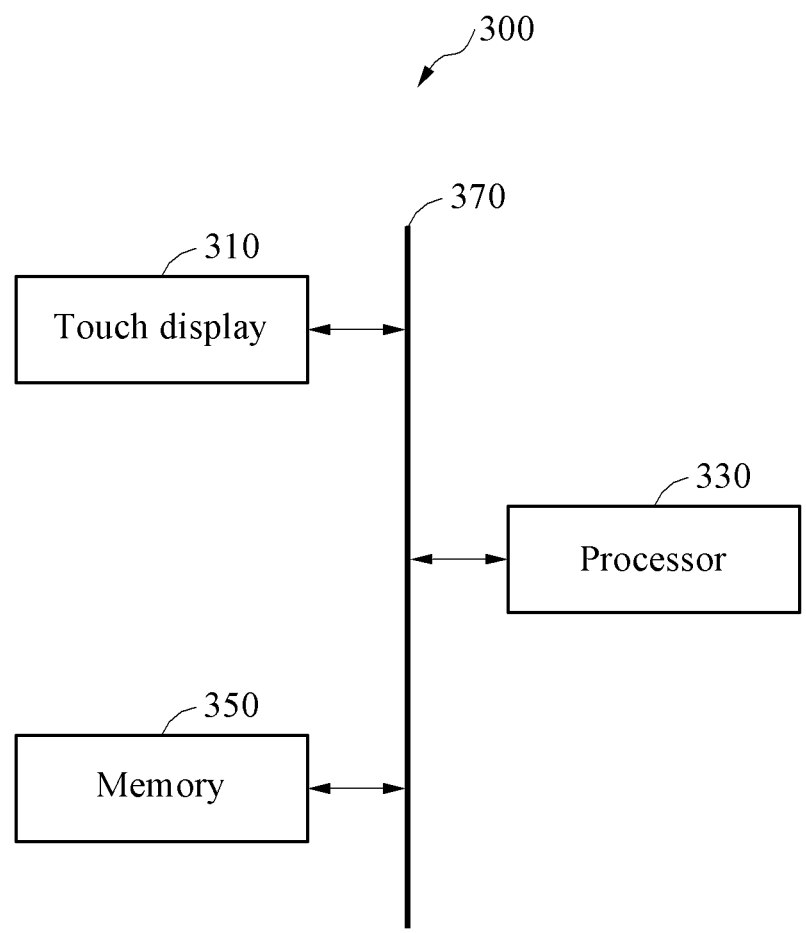
FIG. 3 is a block diagram illustrating an electronic device according to an embodiment.

FIG. 3 is a block diagram illustrating an electronic device according to an embodiment. Referring to FIG. 3, an electronic device 300 according to an embodiment may include a touch display 310, a processor 330 (e.g., the processor 120 of FIG. 1), and a memory 350 (e.g., the memory 130 of FIG. 1). The touch display 310, the processor 330 and the memory 350 may be coupled by bus 370. For example, the electronic device is an example of the electronic device 101.

The touch display 310 may display a first graphic affordance (e.g., a first graphic affordance 415 of FIG. 4) at a preset position, and receive a selection for the first graphic affordance 415. Here, a "graphic affordance" may be an object that indicates a possible (e.g., induces) action of a user and may include various graphic effects and/or various acoustic effects. For example, an icon, a button, or a touch bar may correspond to a type of graphic affordance that induces an action of a user to touch and/or select the corresponding object, but is not necessarily limited thereto.

The "first graphic affordance" may correspond to a graphic affordance displayed on a screen that first appears on a display of a user terminal, that is, a screen (e.g., a screen 410 of FIG. 4) that appears before an interaction (e.g., a touch input) with the touch display 310.

In response to a selection through a touch input provided through the touch display 310, the processor 330 may replace the first graphic affordance 415 with a second graphic affordance (e.g., a second graphic affordance 425, 435, 445 of FIG. 4) to be deformed according to an action of the user. The "second graphic affordance" 425, 435, 445 may correspond to a graphic object that replaces the first graphic affordance 415, which for example may be displayed instead of the first graphic affordance 415, in response to the receiving of the selection for the first graphic affordance 415. Types of graphic affordance(s) will be described in more detail with reference to FIG. 4 below.

According to an embodiment, the processor 330 may replace, based on the number of functions matched to the first graphic affordance (e.g., a first graphic affordance 1015 of FIG. 10A), the first graphic affordance 1015 with as many graphic affordances as the functions. For example, when one function is matched to the first graphic affordance 1015, the processor 330 may replace the first graphic affordance 1015 with a second graphic affordance (e.g., a second graphic affordance 1025, 1035, 1045 of FIG. 10A). When two functions are matched to the first graphic affordance 1015, the processor 330 may replace the first graphic affordance 1015 with a second graphic affordance (e.g., a second graphic affordance 1063 of FIG. 10B) and a third graphic affordance (e.g., a third graphic affordance 1066 of FIG. 10B) that respectively correspond to the two functions. Alternatively, when three functions are matched to the first graphic affordance, the processor 330 may replace the first graphic affordance with a second graphic affordance, a third graphic affordance, and a fourth graphic affordance that respectively correspond to the three functions. A method of replacing, based on the number of functions matched to the first graphic affordance, the first graphic affordance 1015 with as many graphic affordances as the functions by the processor 330 will be described in more detail with reference to FIGS. 10A and 10B below.

The processor 330 may execute a function matched to the first graphic affordance 415 based on a moving distance by a user interaction corresponding to the second graphic affordance 425, 435, 445 and whether a contact with the touch display is maintained. Here, the "moving distance by the user interaction" may be construed as a moving distance corresponding to (or a distance between) an initial position and a final position of a movement while a contact by the user interaction on the touch display 310 is maintained. For example, when the user moves 3 centimeters (cm) to the right on the touch display 310 by a user interaction such as a drag input and then moves 2 cm back to the left while maintaining the contact, a moving distance by the user interaction may be 1 cm. "Whether a contact with the touch display is maintained" may correspond to whether the user performs a user interaction such as a touch input or drag input by contacting the touch display 310 with a body part (e.g., a finger) and then releases the contact by taking the body part away from the touch display 310 or maintains the contact with the touch display 310. A state in which the user takes a body part away from the touch display 310 may be expressed as that "the contact is released", and a state in which the user contacts the touch display 310 with a body part may be expressed as that "the contact is maintained".

Here, the "function matched to the first graphic affordance" may include, for example, at least one of a flash function, a do-not-disturb setting function, a call-related function, a timer setting function, a camera capturing function, a weather search function, a voice record function, and a Bixby function, as listed in Table 600 of FIG. 6 below, and is not necessarily limited thereto.

The first graphic affordance 415 may have a shape corresponding to (e.g., implying) a function matched to the first graphic affordance. When the function matched to the first graphic affordance 415 is a camera capturing function, the first graphic affordance 415 may have, for example, a camera shape. Alternatively, when the function matched to the first graphic affordance 415 is a weather search function, the first graphic affordance 415 may have, for example, a shape with the sun and rain together or an umbrella shape.

For example, the processor 330 may execute the function matched to the first graphic affordance 415 based on a result of comparing the moving distance by the user interaction and a first threshold, and whether the contact with the touch display is maintained. A method of executing the function matched to the first graphic affordance 415 based on the result of comparing the moving distance by the user interaction and the first threshold, and whether the contact with the touch display is maintained, by the processor 330, will be described in more detail with reference to FIGS. 5A and 5B below.

In addition, the processor 330 may perform at least one method described with reference to FIGS. 4 to 15 below or an algorithm corresponding to the at least one method. The processor 330 may be a hardware-implemented electronic device having a circuit that is physically structured to execute desired operations. For example, the desired operations may include code or instructions included in a program. The processor 330 may be implemented as, for example, a central processing unit (CPU), a graphics processing unit (GPU), or a neural network processing unit (NPU). The hardware-implemented electronic device 300 may include, for example, a microprocessor, a central processing unit (CPU), a processor core, a multi-core processor, a multiprocessor, an application-specific integrated circuit (ASIC), and a field-programmable gate array (FPGA).

The processor 330 may execute a program and control the electronic device 300. Program codes to be executed by the processor 330 may be stored in the memory 350.

The memory 350 may store computer-executable instructions. Further, the memory 350 may store a variety of information generated in the processing process of the processor 330 described below. In addition, the memory 350 may store a variety of data and programs. The memory 350 may include a volatile memory or a non-volatile memory. The memory 350 may include a high-capacity storage medium such as a hard disk to store a variety of data.

Figure 4:
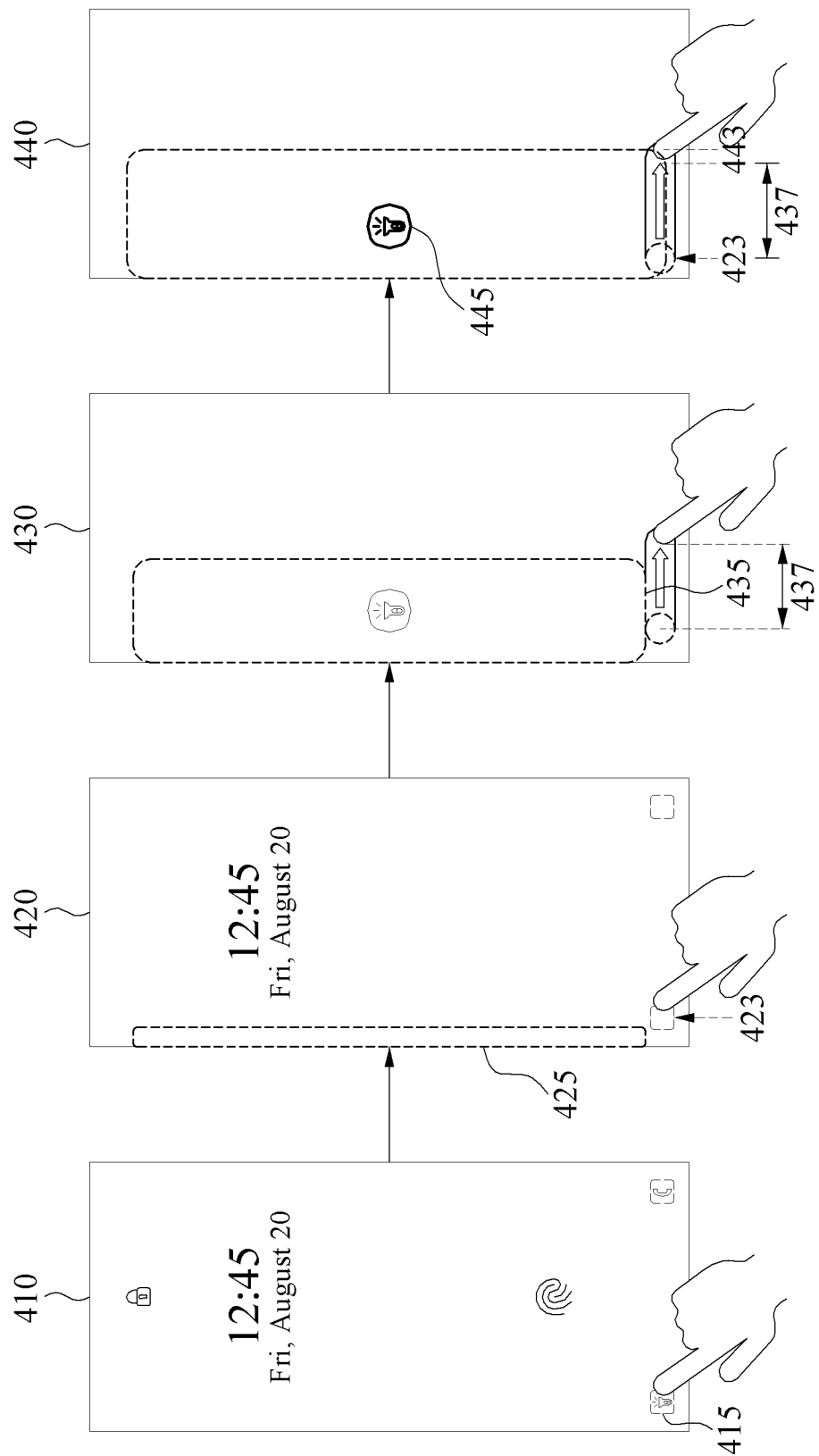
FIG. 4 is a diagram illustrating graphic affordances according to an embodiment.

FIG. 4 is a diagram illustrating graphic affordances according to an embodiment. Referring to FIG. 4, the screen 410 including the first graphic affordance 415 and screens 420, 430, and 440 including the second graphic affordance 425 according to an embodiment are illustrated.

The "first graphic affordance" 415 may correspond to a graphic affordance that first appears on a display of an electronic device (e.g., the electronic device 101 of FIG. 1 and the electronic device 300 of FIG. 3), in other words, that is displayed on the screen 410 before touched by the user. The first graphic affordance 415 may have a fixed shape or form corresponding to the matched function.

The "second graphic affordance" 425 may correspond to a graphic object that is displayed to replace the first graphic affordance 415 in response to the receiving of a selection of a user for the first graphic affordance 415. The second graphic affordance 425 may be deformed and/or changed according to an action (e.g., a touch input or a drag input) with respect to the second graphic affordance 425. The second graphic affordance 425 may guide a function performable by a user terminal in a situation in which an interaction for the second graphic affordance is maintained.

For example, a selection for the first graphic affordance 415 displayed on the screen 410 may be received. The screen 410 may be, for example, a lock screen. In this case, in response to the selection, the second graphic affordance 425 in the form of a thin panel displayed in a portion of the left side of the screen 420 may replace the first graphic affordance 415. As the second graphic affordance 425 replaces the first graphic affordance 415, the first graphic affordance 415 may disappear from the screen 420.

Thereafter, as a drag input continues from a point 423 where the second graphic affordance 425 is first touched, a changed second graphic affordance 435 may be displayed, as shown in the screen 430. In addition to the second graphic affordance 425, an icon guiding a function (e.g., a flash function) matched to the first graphic affordance 415 may be added to the second graphic affordance 435. At this time, the icon added to the screen 430 may be displayed to be dimmed in an inactive state, and guide that the user terminal may perform a flash function in a situation in which the interaction for the second graphic affordance 435 is maintained. In this case, in proportion to an increase in a moving distance by the user interaction in the second graphic affordance 425, a width of a panel displayed in the second graphic affordance 425 may increase as shown in the second graphic affordance 435. The "moving distance" by the user interaction refers to a distance by which the user moves by dragging from the point 423 where the second graphic affordance 425 is first touched and may correspond to, for example, a distance in a horizontal direction from a left side on which the second graphic affordance 425 is touched, that is, a distance by which the user moves in a horizontal direction from the point 423 where the user touches the second graphic affordance 425 and starts to move.

When the moving distance by the user interaction in the second graphic affordance 435 exceeds a preset first threshold 437, the electronic device 101, 300 may activate the icon 445 included in the second graphic affordance, as shown in the screen 440. For example, a color and/or contrast or the icon may change. Here, the "first threshold" 437 may correspond to, for example, a threshold distance by which the user moves in the horizontal direction from the position at which the second graphic affordance 425 is triggered through a touch by the user. The "first threshold" 437 may correspond to a moving distance that serves as a reference for determining whether to execute a function matched to the first graphic affordance 415 on a touch display (e.g., the touch display 310 of FIG. 3).

When the touch input is released at a point 443 exceeding the first threshold 437 in a state in which the icon 445 is activated on the screen 440, the moving distance from the point 423 to the point 443 exceeds the first threshold 437, and thus, the electronic device 101, 300 may execute the flash function matched to the first graphic affordance 415.

For example, a light-emitting diode (LED) of the electronic device 101 may be turned on.

In an embodiment, the shape or form of the first graphic affordance 415 is fixed, whereas the second graphic affordance 425 may be visually changed in various manners according to an action on the second graphic affordance 425.

The second graphic affordance 425 may be visually deformed to the second graphic affordances 435 and 445 in shape, form, and color in various manners, for example, as shown in the screen 430 or the screen 440, according to the moving distance by the user interaction corresponding to the second graphic affordance 425 and whether the contact with the second graphic affordance 425 is maintained. A method of changing the second graphic affordance 425 by the electronic device 101, 300 will be described in more detail with reference to FIGS. 7 to 9 below.

According to an embodiment, when a plurality of (e.g., two) functions, such as a first function and a second function, are matched to the first graphic affordance 415, a third graphic affordance corresponding to the second function may be displayed on the screen together with the second graphic affordance corresponding to the first function. An embodiment in which the second graphic affordance and the third graphic affordance are displayed together will be described in more detail with reference to FIGS. 8B and 10B below.

Figure 5A:
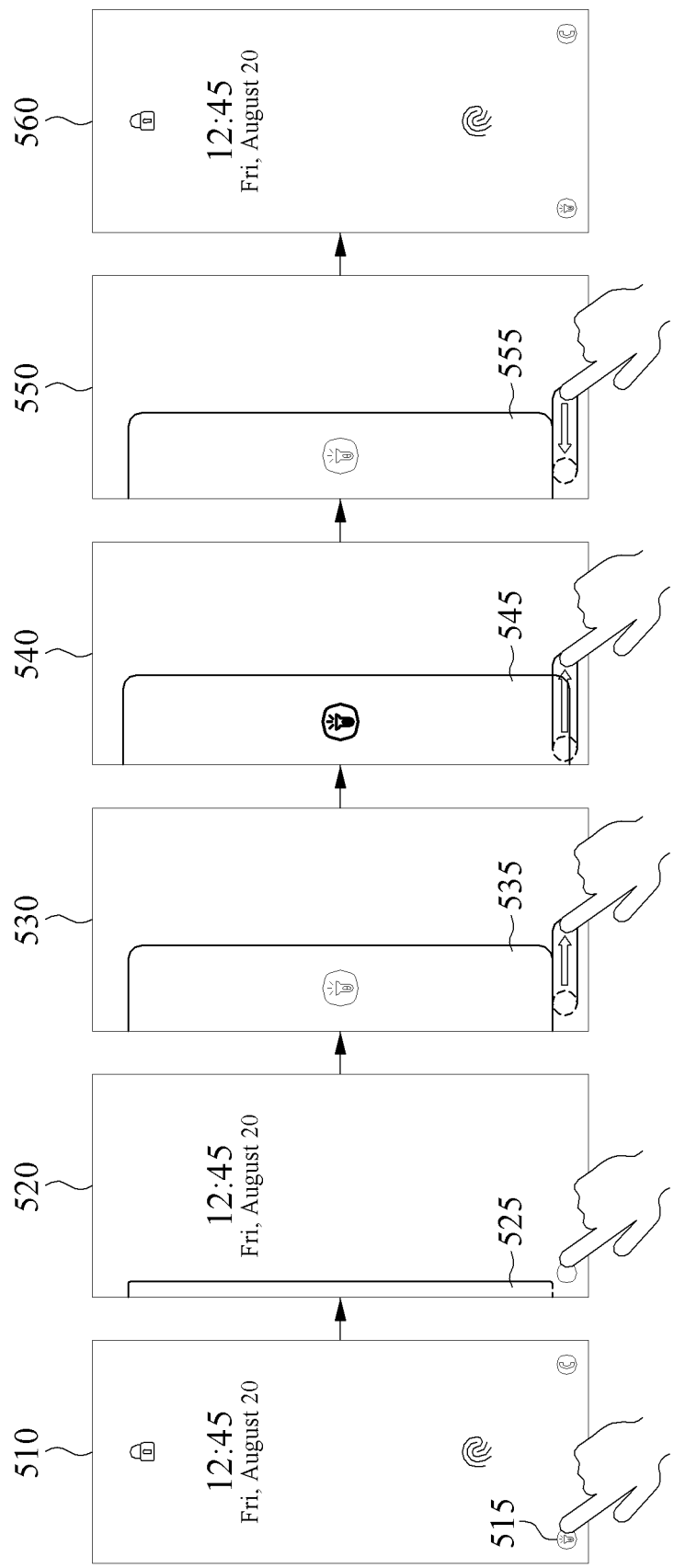
FIGS. 5A and 5B are diagrams illustrating a method of executing a function matched to a first graphic affordance based on a moving distance by a user interaction corresponding to a second graphic affordance and whether a contact with a touch display is maintained according to embodiments.
Figure 5B:
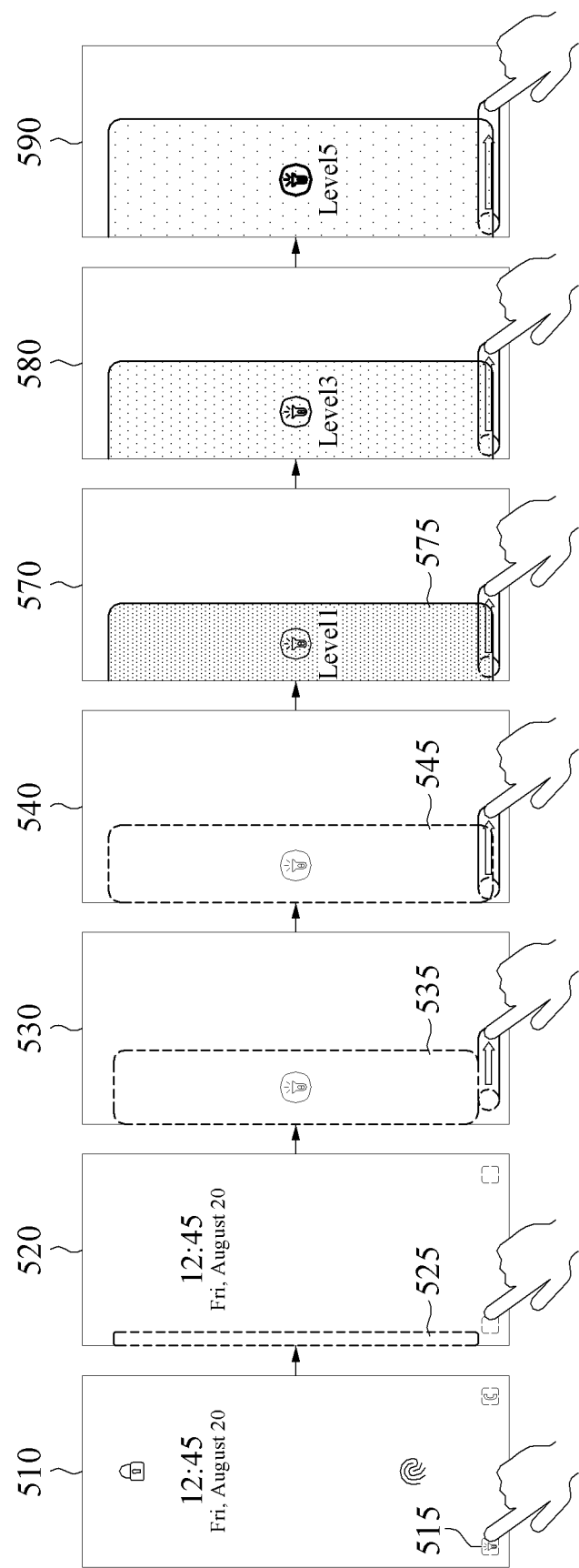

FIGS. 5A and 5B are diagrams illustrating a method of executing a function matched to a first graphic affordance based on a moving distance by a user interaction corresponding to a second graphic affordance and whether a contact with a touch display is maintained according to embodiments.

Referring to FIG. 5A, a situation of returning, after a first graphic affordance 515 displayed on a lock screen 510 is replaced with a second graphic affordance 525 as shown in a screen 520, to a screen 560 displaying a first graphic affordance without performing a function (e.g., a flash function) matched to the first graphic affordance 515 according to a user interaction corresponding to the second graphic affordance 525 is illustrated.

For example, when the first graphic affordance 515 displayed on the lock screen 510 of an electronic device (e.g., the electronic device 101 of FIG. 1 and the electronic device 300 of FIG. 3) is selected by a touch input of a user, the electronic device 101, 300 may replace the first graphic affordance 515 with the second graphic affordance 525, which may be a panel displayed in a portion on the left side of the screen 520. As the first graphic affordance 515 is replaced with the second graphic affordance 525, the first graphic affordance 515 may disappear as shown in the screen 520.

Thereafter, when the user performs a user interaction (e.g., a drag input) while maintaining the contact with the second graphic affordance 525, the electronic device 101, 300 may deform the second graphic affordance 525 in response to the user interaction. More specifically, when the user continues the drag input while maintaining the contact with the second graphic affordance 525, the electronic device 101, 300 may maintain displaying the second graphic affordance 525, and increase the size of a second graphic affordance 535 as shown in a screen 530 in proportion to a moving distance by the drag input.

When the moving distance is gradually increased by the drag input for the second graphic affordance 535 to be greater than or equal to a first threshold, the electronic device 101, 300 may activate an icon included in a second graphic affordance 545 to be clear as shown in a screen 540.

For example, a color and/or contrast or the icon may change. At this time, the electronic device 101, 300 may add, to the second graphic affordance 545, at least one of an expression (e.g., "Drag more to set the flash bright.") guiding a function matched to the first graphic affordance 515 and an icon (e.g., a flashlight icon) guiding the function matched to the first graphic affordance 515. Alternatively, the electronic device 101, 300 may add, to the second graphic affordance 545, an acoustic affordance including at least one of a sound and haptics related to the function matched to the first graphic affordance 515. When the user releases the contact by the drag input in a state in which the icon is activated as shown in the screen 540, the electronic device 101, 300 may execute the flash function matched to the first graphic affordance 515.

Alternatively, in the state in which the icon is activated as shown in the screen 540, the user may switch a direction of the drag input for a second graphic affordance 555 to an opposite direction (e.g., to the left) as shown in a screen 550. After the moving distance returns to a distance within the first threshold by the drag input in the opposite direction, the user may release the contact with a touch display (e.g., the touch display 310 of FIG. 3). In this case, the electronic device 101, 300 may return to a screen 560 displaying the first graphic affordance 515. At this time, the screen 560 and the screen 510 may be the same screen.

The electronic device 101, 300 according to an embodiment may return to the screen 560 displaying the first graphic affordance 515 or execute the function matched to the first graphic affordance 515 according to a result of comparing a final moving distance at a point in time at which the user releases the contact with the second graphic affordance 555 and the first threshold.

For example, the electronic device 101, 300 may return to the initial screen 560 displaying the first graphic affordance 515 when the contact is released in a state in which the moving distance by the user interaction is less than the threshold, for example when the second graphic affordance 535 is displayed in the screen 530, or when the moving distance by the user interaction exceeds the first threshold like the second graphic affordance 545, but the final moving distance at the point in time at which the contact is released is less than the first threshold through a following consecutive action like the second graphic affordance 555 in the screen 550.

Referring to FIG. 5B, a situation of performing, after a first graphic affordance 515 displayed on a lock screen 510 of an electronic device 101, 300 according to an embodiment is replaced with a second graphic affordance 525 as shown in a screen 520, a function (e.g., a flash function) matched to the first graphic affordance 515 as shown in screens 570, 580, and 590 according to a user interaction corresponding to the second graphic affordance 525 is illustrated. The description of the screens 510 to 540 in FIG. 5B are the same as the description of the screens 510 to 540 in FIG. 5A, and thus, screens 570, 580, and 590 different from those of FIG. 5A will be mainly described hereinafter.

For example, when the moving distance by the drag input for the second graphic affordance 545 is greater than or equal to the first threshold as shown in the screen 540, and the drag input for the second graphic affordance 545 is continued, the electronic device 101, 300 may perform the function corresponding to the first graphic affordance 515 for each step according to a degree to which the moving distance by the drag input exceeds a second threshold as shown in the screens 570, 580, and 590, in addition to the changing of the second graphic affordance 545. Here, the "second threshold" may correspond to a moving distance that serves as a determination reference for adjusting a step of the function corresponding to the first graphic affordance 515. In addition, the "degree to which the moving distance exceeds the second threshold" may correspond to a degree of change according to a rate proportional to the moving distance when a movement according to a user interaction occurs. The "degree to which the moving distance exceeds the second threshold" may be determined differently according to types of various electronic devices such as, for example, a foldable phone, a smartphone, a wearable device, and a tab. The "degree to which the moving distance exceeds the second threshold" may be determined based on a threshold point preset for each standard of a touch display of each electronic device.

For example, the electronic device 101, 300 may execute "Brightness Level 1" of a function (e.g., a flash function) corresponding to the first graphic affordance 515 as shown in the screen 570 according to the degree to which the moving distance by the drag input exceeds the second threshold. Thereafter, in proportion to a gradual increase in the moving distance by the drag input, the electronic device 101, 300 may execute "Brightness Level 3" of the flash function corresponding to the first graphic affordance 515 as shown in the screen 580, or execute "Brightness Level 5" of the flash function corresponding to the first graphic affordance 515 as shown in the screen 590. As discussed above, as the moving distance changes, the function may be varyingly executed and the second graphic affordance may change. However, embodiments are not limited thereto and the second graphic affordance may change as the moving distance changes, but the function may not be executed until the sliding input is released.

A method of performing, by the electronic device 101, 300, a detailed function corresponding to the first graphic affordance 515 for each step according to a degree to which a moving distance by a user interaction exceeds a threshold will be described in more detail with reference to FIG. 6 below.

FIG. 6 is a table illustrating examples of functions matched to a first graphic affordances according to embodiments. Referring to FIG. 6, Table 600 lists functions corresponding to first graphic affordances, performed by an electronic device (e.g., the electronic device 101 of FIG. 1 and the electronic device 300 of FIG. 3) according to a degree to which a moving distance. For example, the Table 600 may have three thresholds. When the moving distance is between the first and second thresholds, the function in the first column may be executed. When the moving distance is between the second and third thresholds, the function in the second column may be executed. When the moving distance exceeds the third threshold, the function in the third column may be executed. In this regard, by a user interaction (e.g., a drag input) corresponding to a first graphic affordance, a second graphic affordance may be displayed and modified, and a function may be executed.

In an embodiment, the functions corresponding to the first graphic affordance may include, for example, at least one of a flash function, a do-not-disturb setting function, a call-related function, a timer setting function, a camera capturing function, a weather search function, a voice record function, and a Bixby function, and are not necessarily limited thereto.

For example, it may be assumed that a function corresponding to the first graphic affordance in Table 600 is "Do Not Disturb". When the first graphic affordance indicating "Do Not Disturb" is selected, the first graphic affordance may be replaced with the second graphic affordance. When the moving distance by the user interaction (e.g., the drag input) corresponding to the second graphic affordance corresponds to a section of 40% to 50% of the entire width of a touch display (e.g., the touch display 310 of FIG. 3), the electronic device 101, 300 may set a step of Do Not Disturb to "Until I turn it off". Thereafter, when the drag input is continued and the moving distance corresponds to a section of 51% to 60% of the entire width of the touch display 310, the electronic device 101, 300 may set the step of Do Not Disturb to "For 1 hour". Further, when the drag input is continued and the moving distance corresponds to a section of 61% to 70% of the entire width of the touch display 310, the electronic device 101, 300 may set the step of Do Not Disturb to "During bedtime".

In addition, the electronic device 101, 300 may perform or set the various functions disclosed in Table 600 for each step, according to the moving distance by the user interaction corresponding to the second graphic affordance. For example, the first graphic affordance may indicate a timer, and the timer may be set to different time periods based on the moving distance. The first graphic affordance may indicate a camera, and the camera may capture images in different manners based on the moving distance. The first graphic affordance may indicate a weather function, and forecasts for different time periods may be displayed based on the moving distance. The first graphic affordance may indicate a voice record function, and an application may be started or voice recording may be initiated/terminated based on the moving distance. The first graphic affordance may indicate Bixby, and an application may be started or Bixby may be controlled to listen based on the moving distance.

Figure 7:
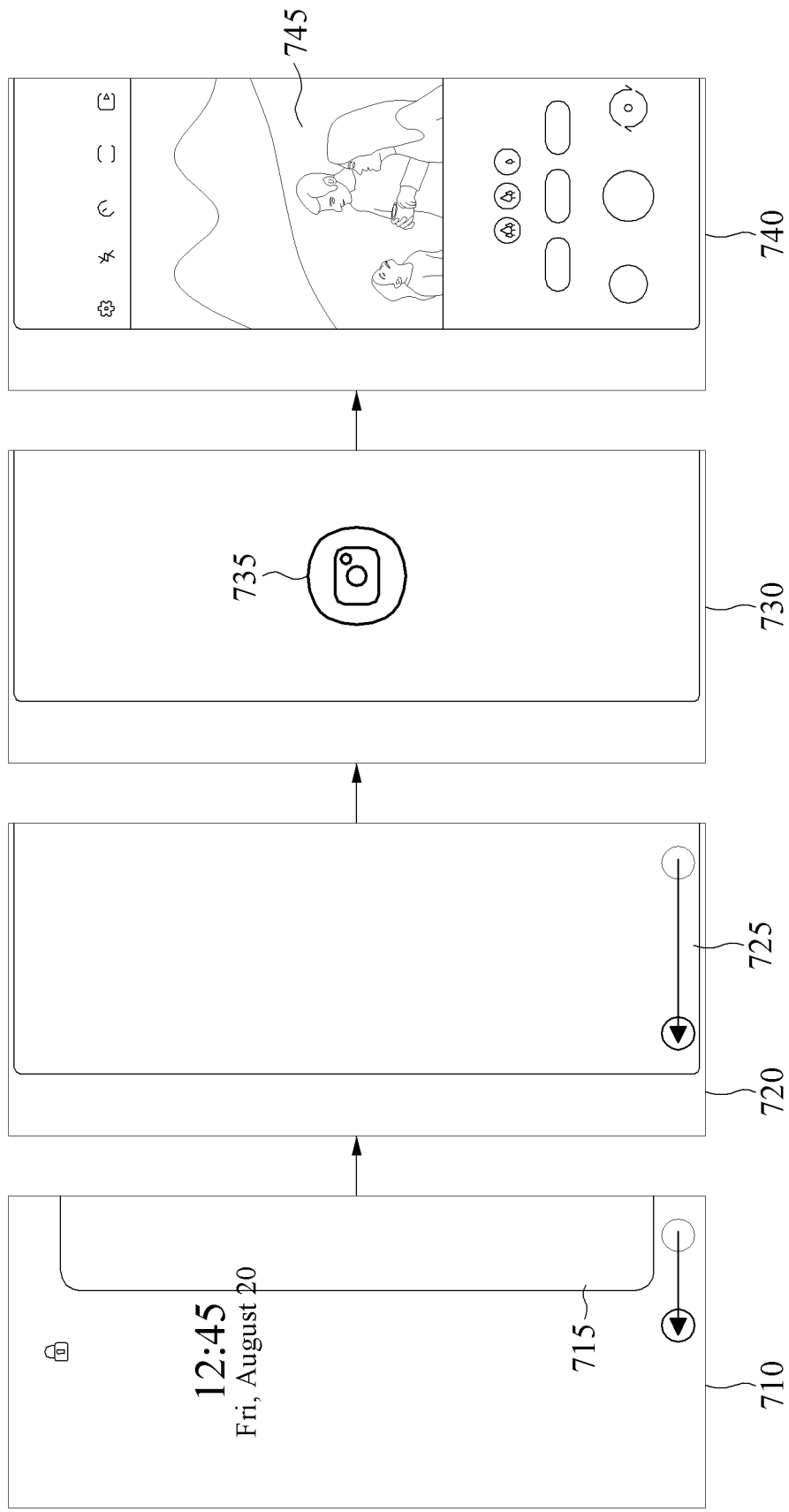
FIG. 7 is a diagram illustrating methods of changing a second graphic affordance according to an embodiment.

FIG. 7 is a diagram illustrating methods of changing a second graphic affordance according to an embodiment. Referring to FIG. 7, a screen 710 including a second graphic affordance 715 and screens 720, 730, and 740 including changed second graphic affordances according to an embodiment are illustrated.

An electronic device (e.g., the electronic device 101 of FIG. 1 and the electronic device 300 of FIG. 3) may change the second graphic affordance 715 when a moving distance by a user interaction (e.g., a drag input) corresponding to the second graphic affordance 715 is greater than or equal to a first threshold and a contact with a touch display (e.g., the touch display 310 of FIG. 3) is maintained.

The electronic device 101, 300 may visually deform the second graphic affordance 715 displayed on the screen 710 like a second graphic affordance 725 displayed on the screen 720. Here, "visually deforming the second graphic affordance" may be construed as the sense of changing at least one of the length, size, shape, form, and color of the second graphic affordance 715 to a visually distinguishable level.

The electronic device 101, 300 may deform the second graphic affordance as shown in the screen 730 by adding an icon 735 guiding a function matched to the first graphic affordance to the second graphic affordance 725. For example, the icon 735 may indicate a camera.

Alternatively, the electronic device 101, 300 may deform the second graphic affordance as shown in the screen 740 by displaying a preview screen 745 corresponding to the function matched to the first graphic affordance so as to be overlaid on the second graphic affordance 725. For example, the preview screen may correspond to a camera function.

In addition, the electronic device 101, 300 may add, to the second graphic affordance 725, an acoustic affordance including at least one of a sound and haptics related to the function matched to the first graphic affordance.

Figure 8A:
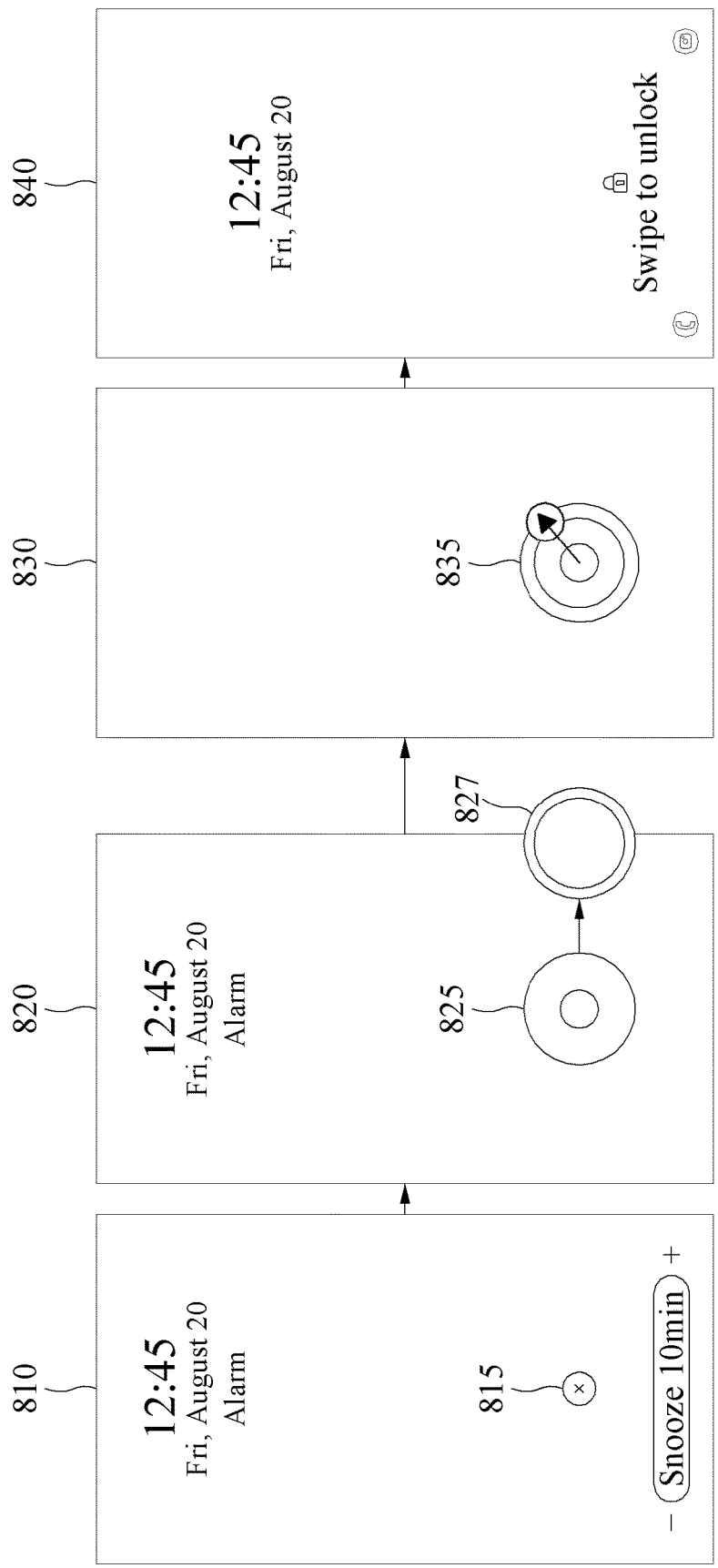
FIGS. 8A and 8B are diagrams illustrating a process in which a second graphic affordance is changed according to a user interaction with respect to the second graphic affordance according to embodiments.
Figure 8B:
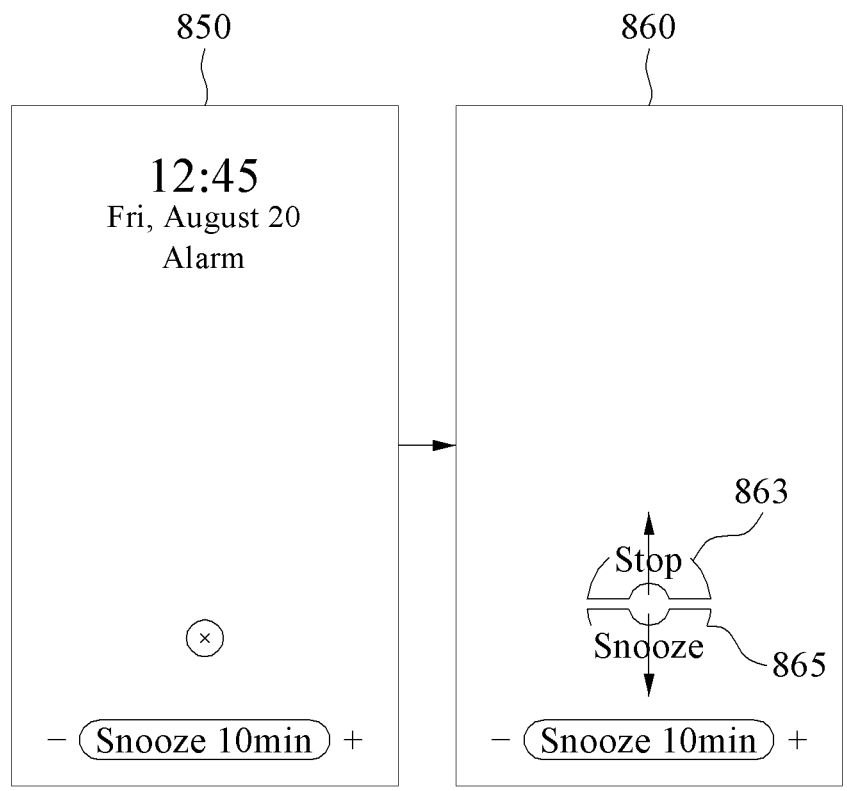

FIGS. 8A and 8B are diagrams illustrating a process in which a second graphic affordance is changed according to a user interaction with respect to the second graphic affordance according to embodiments. Referring to FIG. 8A, a screen 810 displaying a first graphic affordance 815 matched to an alarm stop function, screens 820 and 830 displaying second graphic affordances 825, 827, and 835, and a lock screen 840 on which the alarm stop function corresponding to the first graphic affordance 815 is performed, in an electronic device (e.g., the electronic device 101 of FIG. 1 and the electronic device 300 of FIG. 3) according to an embodiment are illustrated.

When a selection for the first graphic affordance 815 on the screen 810 is input, the electronic device 101, 300 may replace the first graphic affordance 815 with the second graphic affordance 825 as shown in the screen 820. Thereafter, a second input (e.g., a swipe input) may occur while a first input (e.g., a touch input) for the second graphic affordance 825 is maintained. In this case, the electronic device 101, 300 may change the shape of the second graphic affordance 825 like the second graphic affordance 827. When the second input (e.g., the swipe input) for the changed second graphic affordance 827 continues, the electronic device 101, 300 may additionally change the second graphic affordance 827 like the second graphic affordance 835 displayed on the screen 830.

In FIG. 8A, the one function matched to the first graphic affordance 815 may be an alarm stop function. The second input (e.g., the swipe input) occurring on the screen 830 may continue, such that a moving distance by the second input may exceed a first threshold.

In this case, when the second input in a concentric direction for the second graphic affordance 835 occurs, the electronic device 101, 300 may perform the alarm stop function matched to the first graphic affordance 815, irrespective of a direction of the second input. For example, when the moving distance exceeds the first threshold and the input is released, the same function may be performed whether the direction of the second input is upward, downward, leftward, or rightward. As the alarm stop function is performed, the electronic device 101, 300 may display the lock screen 840 in which the alarm function is stopped.

Referring to FIG. 8B, a screen 850 displaying a first graphic affordance 815 matched to an alarm-related function, and a screen 860 including a second graphic affordance 863 corresponding to an alarm stop function and a third graphic affordance 865 corresponding to a snooze function, when two functions (e.g., the alarm stop function and the snooze function) are matched to the first graphic affordance 815815 according to an embodiment, are illustrated.

When a plurality of functions are matched to the first graphic affordance, the first graphic affordance 815 may be replaced with as many graphic affordances (e.g., the second graphic affordance 863 and the third graphic affordance 865) as the plurality of functions as shown in the screen 860, as a selection of a user for the first graphic affordance 815 is input.

At this time, a detailed function matched to each of the second graphic affordance 863 and the third graphic affordance 865 may be executed based on a moving distance by a user interaction corresponding to each of the second graphic affordance 863 and the third graphic affordance 865, a moving direction, and whether the contact with the touch display is maintained.

For example, the user interaction may move upward (↑) from below while a contact with the second graphic affordance 863 is maintained, and the moving distance by the user interaction corresponding to the second graphic affordance 863 may be greater than or equal to a first threshold. In this case, the electronic device 101, 300 may perform an alarm stop function, which is the detailed function matched to the second graphic affordance 863. Alternatively, the user interaction may move downward (↓) from above while a contact with the third graphic affordance 865 is maintained, and the moving distance by the user interaction corresponding to the third graphic affordance 865 may be greater than or equal to the first threshold. In this case, the electronic device 101, 300 may perform a snooze function, which is the detailed function matched to the third graphic affordance 865.

When a plurality of functions are matched to the first graphic affordance 815, the electronic device 101, 300 may replace the first graphic affordance 815 with the second graphic affordance 863 and the third graphic affordance 865 as a selection for the first graphic affordance 815 is input, thereby informing the user that a different function may be performed according to an action direction. In addition, when a plurality of functions are matched to the first graphic affordance 815, the electronic device 101, 300 may execute the detailed function matched to each of the graphic affordances further considering a moving direction by the user interaction, in addition to the moving distance by the user interaction and whether the contact with the touch display is maintained.

Figure 9:
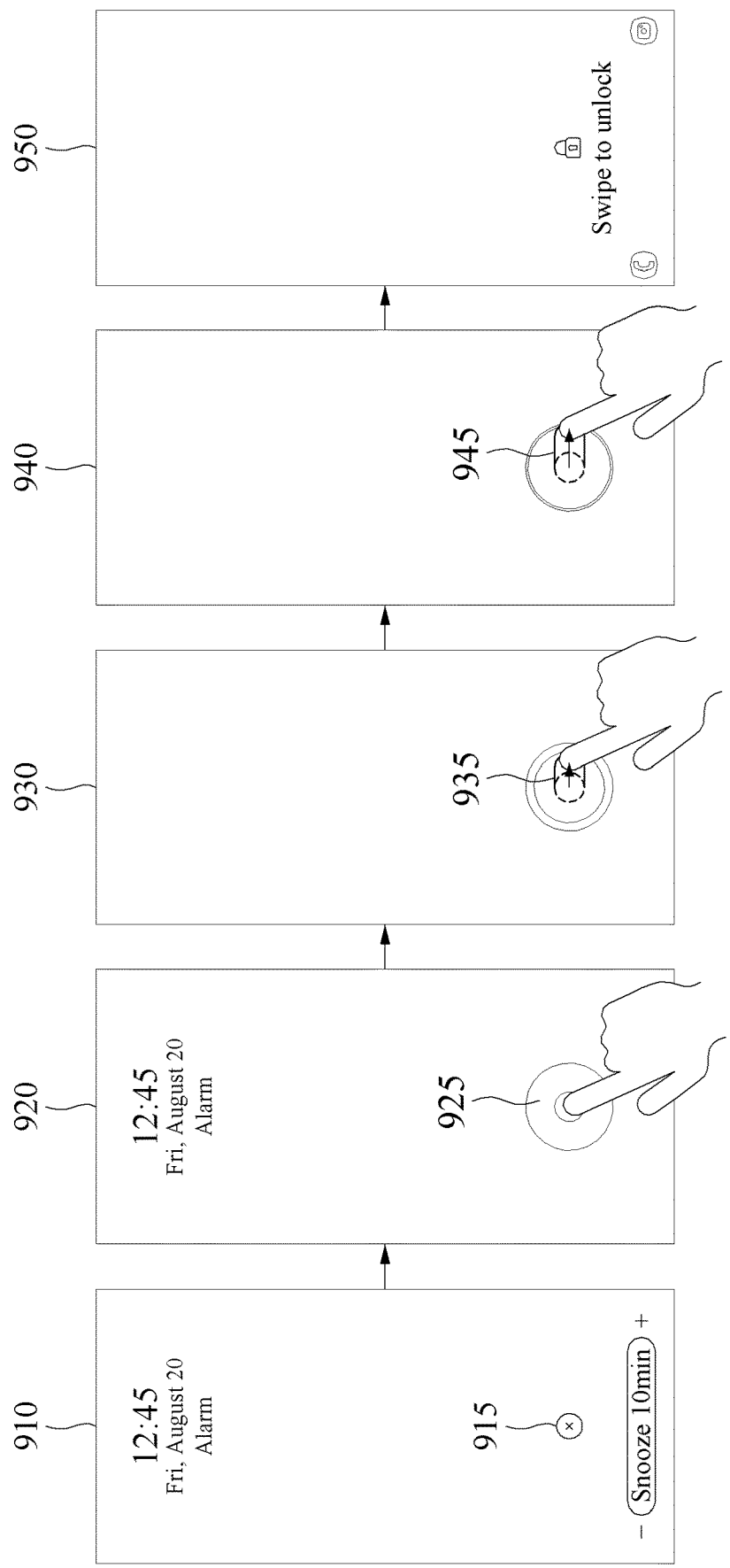
FIG. 9 is a diagram illustrating a process of executing an alarm stop through a graphic affordance according to an embodiment.

FIG. 9 is a diagram illustrating a process of executing an alarm stop through a graphic affordance according to an embodiment. Referring to FIG. 9, a screen 920 displaying a second graphic affordance 925 that replaces a first graphic affordance 915 as a selection of a user for the first graphic affordance 915 displayed on a lock screen 910 of an electronic device (e.g., the electronic device 101 of FIG. 1 and the electronic device 300 of FIG. 3) according to an embodiment is input, screens 930 and 940 showing a process of performing a user interaction for the second graphic affordance 925, and a lock screen 950 on which an alarm stop function is performed may be displayed.

When the selection for the first graphic affordance 915 displayed on the screen 910 is input, the electronic device 101, 300 may replace the first graphic affordance 915 with the second graphic affordance 925 as shown in the screen 920. At this time, a function matched to the first graphic affordance 915 may be, for example, an alarm stop function.

When a user interaction is moved to the right while a contact with the second graphic affordance 925 is maintained, the electronic device 101, 300 may change the form of the second graphic affordance 925 like a second graphic affordance 935 displayed on the screen 930. When the changed second graphic affordance 935 is continuously moved to the right, the electronic device 101, 300 may change the second graphic affordance 935 like a second graphic affordance 945 displayed on the screen 940.

When a moving distance from the second graphic affordance 925 displayed on the screen 920 to the second graphic affordance 945 displayed on the screen 940 is greater than or equal to a first threshold, the electronic device 101, 300 may perform the alarm stop function, which is a function corresponding to the first graphic affordance 915. As the electronic device 101, 300 performs the alarm stop function, the lock screen 950 with an alarm stopped as the alarm stop function is performed may be displayed.

Figure 10A:
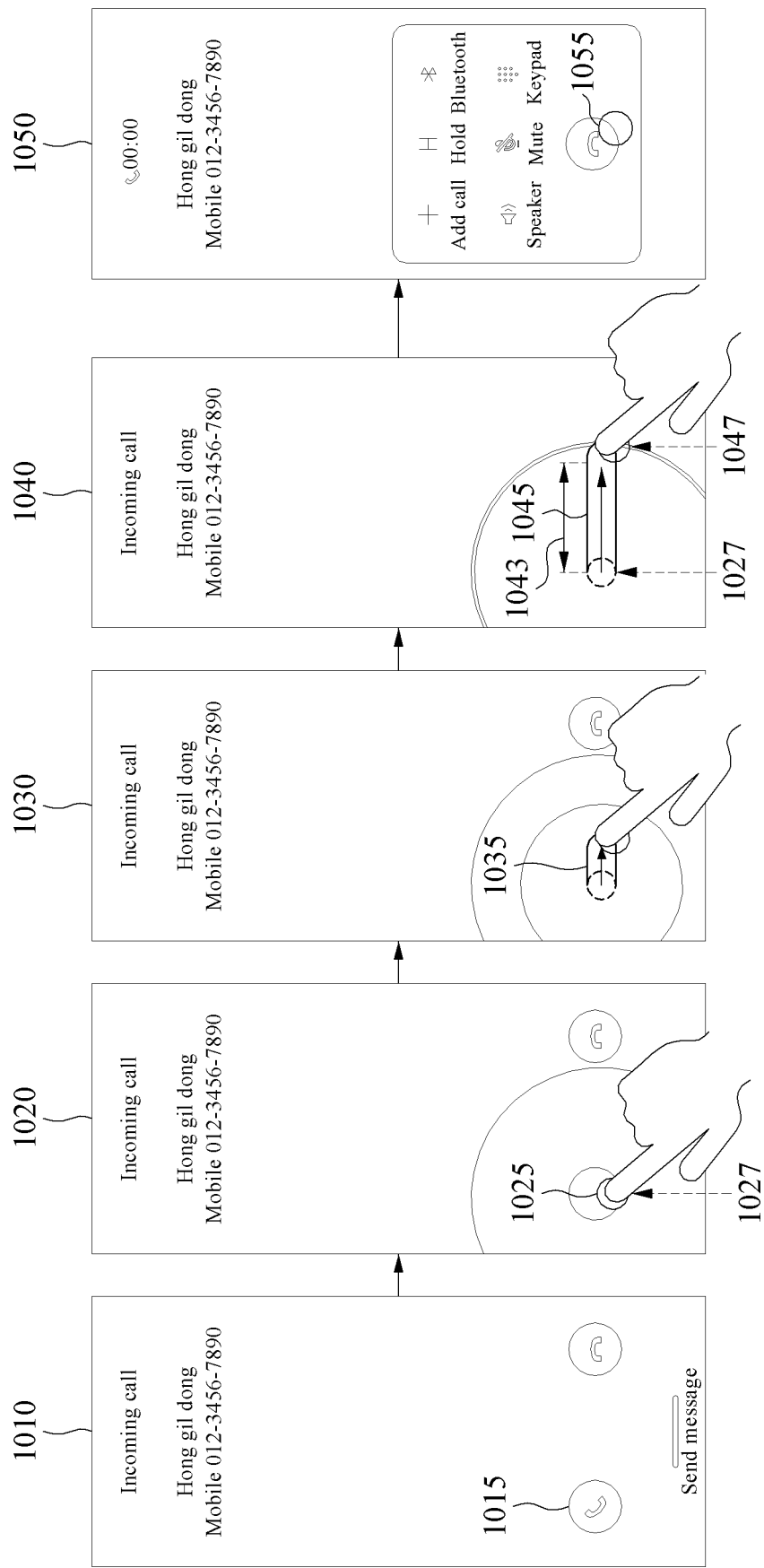
FIGS. 10A and 10B are diagrams illustrating a method of displaying as many functions as matched to a first graphic affordance according to embodiments.
Figure 10B:
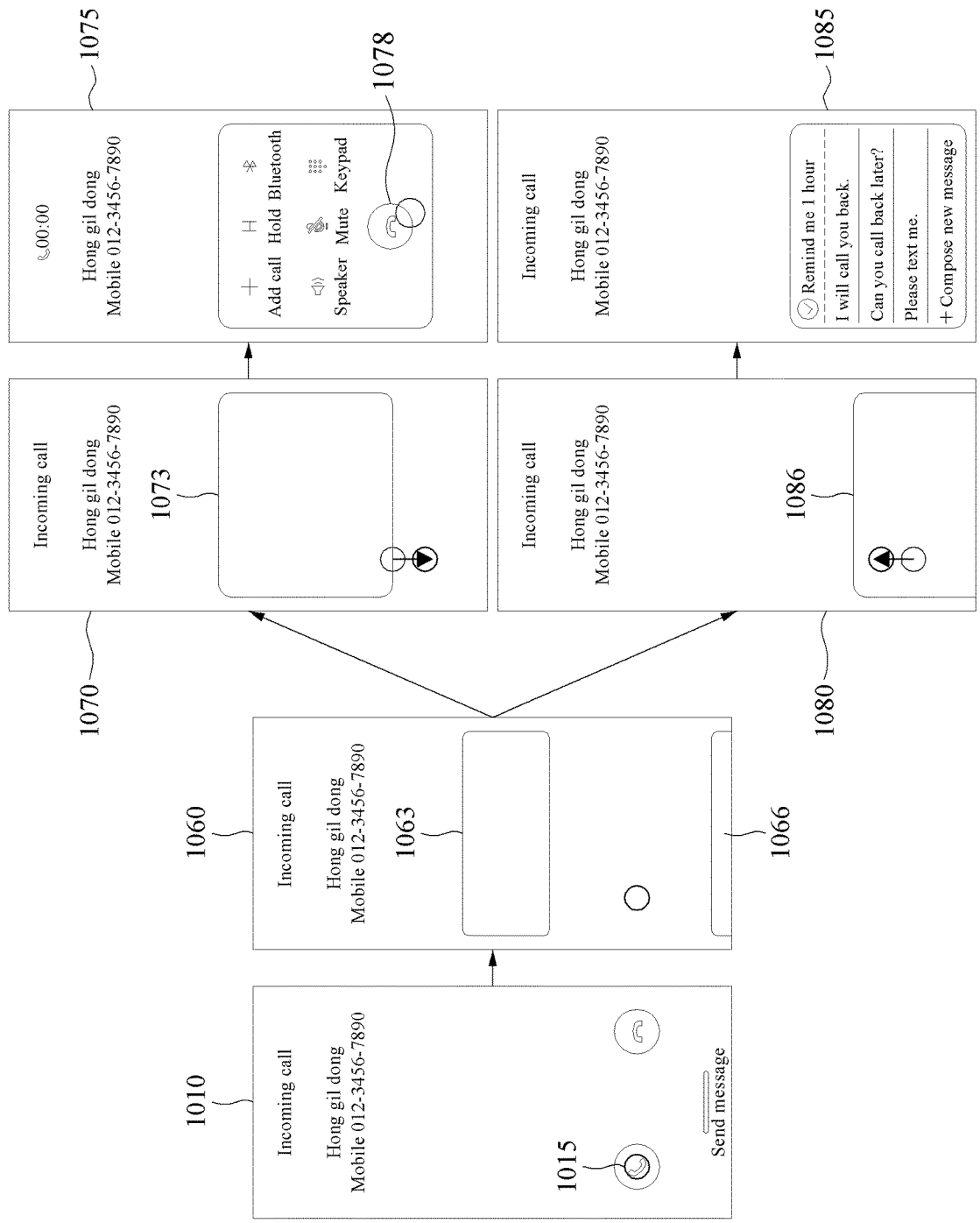

FIGS. 10A and 10B are diagrams illustrating a method of displaying as many functions as matched to a first graphic affordance according to embodiments.

Referring to FIG. 10A, screens 1010, 1020, 1030, 1040, and 1050 showing a process of performing, by an electronic device (e.g., the electronic device 101 of FIG. 1 and the electronic device 300 of FIG. 3) according to an embodiment, a function matched to a first graphic affordance 1015 when one function (e.g., an incoming call accept function) is matched to the first graphic affordance 1015 are illustrated.

For example, when a selection of a user of the first graphic affordance 1015 displayed on the incoming call screen 1010 is input, the electronic device 101, 300 may replace the first graphic affordance 1015 with a second graphic affordance 1025 as shown in the screen 1020.

When a user interaction (e.g., a drag to the right) corresponding to the second graphic affordance 1025 is gradually continued starting from a point 1027, the electronic device 101, 300 may maintain displaying the second graphic affordance 1025. At this time, as the second graphic affordance 1025 is continuously dragged to the right, the electronic device 101, 300 may display the second graphic affordance 1025 in the form that gradually deforms in proportion to a moving distance by the drag, like a second graphic affordance 1035 of the screen 1030 and a second graphic affordance 1045 of the screen 1040.

Here, the "moving distance" by the drag may correspond to a moving distance (a linear distance) from the point 1027 where the user interaction corresponding to the second graphic affordance 1025 starts to a point 1047 where the user interaction ends.

In a state in which the moving distance from the point 1027 of the second graphic affordance 1025 displayed on the screen 1020 to the point 1047 of the second graphic affordance 1045 displayed on the screen 1040 is greater than or equal to a first threshold 1043, the user may release the contact with the second graphic affordance 1045. The first threshold 1043 may be, for example, a reference value for comparing the moving distance from the point 1027 where the user interaction corresponding to the second graphic affordance 1025 starts to the point 1047 where the user interaction ends, and may correspond to a predetermined threshold distance from the second graphic affordance 1025 (regardless of a direction). In this case, the electronic device 101, 300 may perform the incoming call accept function matched to the first graphic affordance 1015. As the electronic device 101, 300 performs the incoming call accept function, a call connection screen 1050 may be displayed. As a call button 1055 displayed in the shape of a phone on the call connection screen 1050 is selected by the user, the electronic device 101, 300 may perform a call.

Referring to FIG. 10B, screens 1010, 1060, 1070, 1075, 1080, and 1085 showing a process of performing two functions matched to the first graphic affordance 1015, when two functions (e.g., an incoming call accept function and an incoming call reject function) are matched to the first graphic affordance 1015, are illustrated.

For example, when a selection of a user for the first graphic affordance 1015 displayed on the incoming call screen 1010 is input, the electronic device 101, 300 may replace the first graphic affordance 1015 with a second graphic affordance 1063 corresponding to the incoming call accept function and a third graphic affordance 1066 corresponding to the incoming call reject function as shown in the screen 1060.

At this time, when a drag input on the second graphic affordance 1063 occurs downward G1 from above, the electronic device 101, 300 may expand the second graphic affordance 1063 like a second graphic affordance 1073 of the screen 1070. When the drag input on the second graphic affordance 1073 is continued and a moving distance corresponding to the second graphic affordance 1073 exceeds a second threshold, the electronic device 101, 300 may execute a detailed function (e.g., a call connection screen providing function) matched to the second graphic affordance 1063 as shown in the screen 1075. At this time, the screen 1075 may correspond to a call connection screen informing that the user will answer a call. As a call button 1078 displayed in the shape of a phone on the call connection screen 1075 is selected by the user, the electronic device 101, 300 may perform a call connection.

Alternatively, when a drag input on the third graphic affordance 1066 displayed on the screen 1060 occurs upward (↑) from below, the electronic device 101, 300 may expand the third graphic affordance 1066 like a third graphic affordance 1086 of the screen 1080. When the drag input on the third graphic affordance 1086 is continued and a moving distance corresponding to the third graphic affordance 1086 exceeds a second threshold, the electronic device 101, 300 may execute a detailed function (e.g., a call reject message sending screen providing function) matched to the third graphic affordance 1066 as shown in the screen 1085. At this time, the screen 1085 may include one of various call reject messages (e.g., "I will call you back", "Can you call back later?", or "Please text me") indicating that the user will not answer the call, and is not necessarily limited thereto.

As any one of the various call reject messages displayed on the screen 1085 is selected by the user, the electronic device 101, 300 may send the selected message to a caller.

Figure 11:
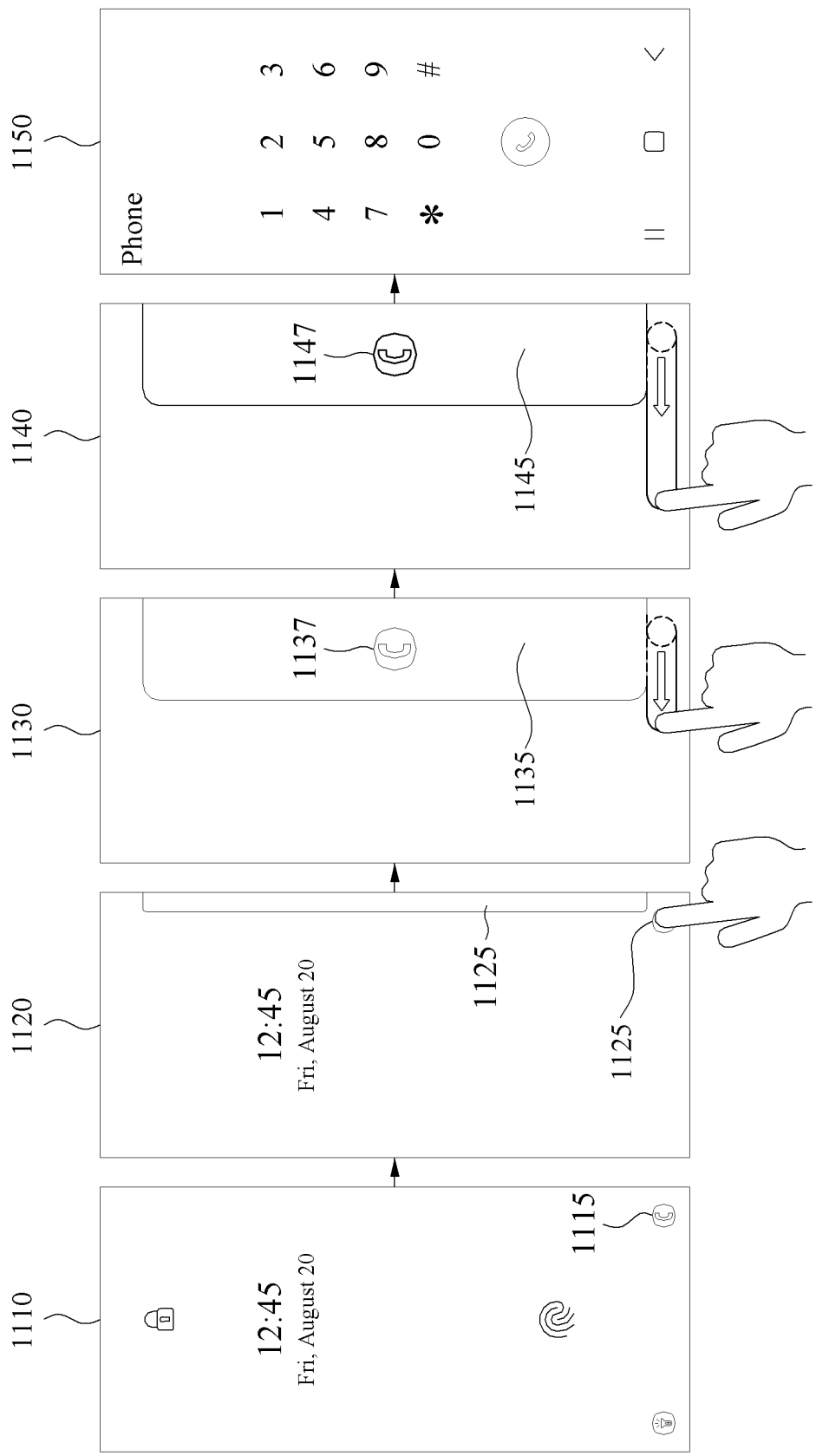
FIG. 11 is a diagram illustrating a method of performing a function matched to a first graphic affordance according to an embodiment.

FIG. 11 is a diagram illustrating a method of performing a function matched to a first graphic affordance according to an embodiment. Referring to FIG. 11, screens 1120, 1130, 1140, and 1150 showing a process of performing an executing call function matched to a first graphic affordance 1115 as the first graphic affordance 1115 displayed on a lock screen 1110 of an electronic device (e.g., the electronic device 101 of FIG. 1 and the electronic device 300 of FIG. 3) according to an embodiment is selected by a user are illustrated.

For example, the first graphic affordance 1115 matched to the executing call function may be displayed on the lower right side of the lock screen 1110. As the selection for the first graphic affordance 1115 is input, the electronic device 101, 300 may replace the first graphic affordance 1115 with a second graphic affordance 1125 as shown in the screen 1120. As a drag input for the second graphic affordance 1125 is continued, the electronic device 101, 300 may change the second graphic affordance 1125 with a second graphic affordance 1135 as shown in the screen 1130. At this time, the electronic device 101, 300 may expand an area of a panel displayed in the second graphic affordance 1125 in proportion to an increase in a moving distance by the continued drag input for the second graphic affordance 1125. An icon 1137 guiding an executing call function matched to the first graphic affordance 1115 may be added to the second graphic affordance 1135. At this time, the icon 1137 may be displayed to be dimmed in an inactive state. The icon 1137 may guide that the electronic device 101, 300 may perform the executing call function in a situation in which an interaction for the second graphic affordance 1135 is maintained.

As a moving distance by the continued drag input for the second graphic affordance 1135 exceeds a preset first threshold, the electronic device 101, 300 may activate an icon 1147 included in the second graphic affordance 1145 as shown in the screen 1140. For example, a color and/or contrast or the icon may change.

When the user releases a contact of the drag input in a situation in which the icon 1147 is activated, the electronic device 101, 300 may display the executing call screen 1150. The executing call screen 1150 may be a screen corresponding to the executing call function matched to the first graphic affordance 1115.

FIG. 12 is a diagram illustrating form factors indicating positions at which a first affordance may be displayed for electronic devices according to embodiments. Referring to FIG. 12, a form factor 1210 indicating positions at which a first affordance is displayed in an electronic device (e.g., the electronic device 101 of FIG. 1 and the electronic device 300 of FIG. 3) according to an embodiment, a form factor 1230 indicating positions at which a first affordance is displayed in a flip-type electronic device 101, 300, a form factor 1250 indicating positions at which a first affordance is displayed in a wearable device-type electronic device 101, 300, a form factor 1270 indicating positions at which a first affordance is displayed in a tablet-type electronic device 101, 300, and a form factor 1290 indicating positions at which a first affordance is displayed in a fold-type electronic device 101, 300 are illustrated.

In the form factor 1210, the form factor 1230, and the form factor 1270, circles marked with broken lines on the left may be positions at which the first affordance is displayed when the electronic device 101, 300 is positioned portrait, and circles marked with broken lines on the right may be positions at which the first affordance is displayed when the electronic device 101, 300 is positioned landscape.

Further, circles marked with broken lines in the first diagram of the form factor 1290 may be positions at which the first affordance is displayed when the fold-type electronic device 101, 300 is positioned portrait and a foldable display is unfolded and expanded. Circles marked with broken lines in the second diagram of the form factor 1290 may be positions at which the first affordance is displayed when the fold-type electronic device 101, 300 is positioned portrait and the foldable display is folded.

In addition, circles marked with broken lines in the third diagram of the form factor 1290 may be positions at which the first affordance is displayed when the fold-type electronic device 101, 300 is positioned landscape and the foldable display is unfolded and expanded.

When the electronic device 101, 300 has a predetermined form factor or a plurality of form factors, the electronic device 101, 300 may determine a form factor in a folded state or an unfolded state. For example, the electronic device 101, 300 may determine a pose of a form factor in view of an arrangement and/or a rotation of the electronic device or an arrangement state of the electronic device. The electronic device 101, 300 may control an affordance to be displayed at a preset position on a display of the electronic device 101, 300 based on a gaze of the user.

The positions at which the first affordance is displayed for the electronic devices, described with reference to FIG. 12, correspond to an example, and are not necessarily limited thereto. In addition, the positions at which the first affordance is displayed may be changed in various manners.

Figure 13:
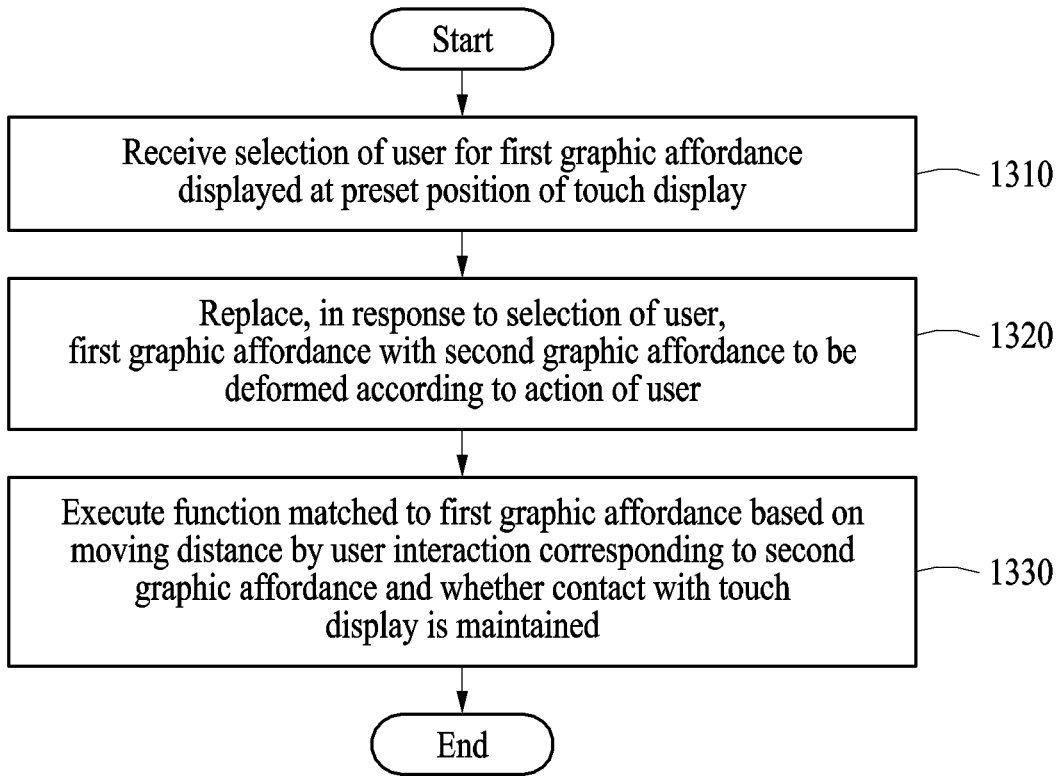
FIG. 13 is a flowchart illustrating an operating method of an electronic device according to an embodiment.

FIG. 13 is a flowchart illustrating an operating method of an electronic device according to an embodiment. Operations may be performed sequentially, but are not necessarily performed sequentially. For example, the operations may be performed in different orders, and at least two of the operations may be performed in parallel.

Referring to FIG. 13, an operation of performing a function matched to a first graphic affordance through operations 1310 to 1330 by an electronic device (e.g., the electronic device 101 of FIG. 1, the electronic device 300 of FIG. 3) according to an embodiment is illustrated. According to embodiments, operations 1310 to 1330 may be performed by a processor (e.g., the processor 120 of FIG. 1, the processor 330 of FIG. 3) of the electronic device 300.

In operation 1310, the electronic device 101, 300 may receive a selection for a first graphic affordance displayed at a preset position of the touch display 310.

In operation 1320, in response to the selection in operation 1310, the electronic device 101, 300 may replace the first graphic affordance with a second graphic affordance that is modified according to an action of the user. For example, the electronic device 101, 300 may replace, based on the number of functions matched to the first graphic affordance, the first graphic affordance with as many graphic affordances as the functions. A method of replacing the first graphic affordance with as many graphic affordances as the functions by the electronic device 101, 300 will be described in more detail with reference to FIG. 14 below.

In operation 1330, the electronic device 101, 300 may execute a function matched to the first graphic affordance based on a moving distance by a user interaction corresponding to the second graphic affordance and whether a contact with the touch display is maintained. For example, the electronic device 101, 300 may execute the function matched to the first graphic affordance based on a result of comparing the moving distance by the user interaction and a first threshold, and whether the contact with the touch display is maintained. A method of executing the function matched to the first graphic affordance by the electronic device 101, 300 will be described in more detail with reference to FIG. 15 below.

According to an embodiment, when the electronic device 101, 300 replaces, based on the number of functions matched to the first graphic affordance, the first graphic affordance with as many graphic affordances as the functions in operation 1320, the electronic device 101, 300 may execute a detailed function matched to each of the graphic affordances based on a moving distance by a user interaction corresponding to each of the graphic affordances that are as many as the functions matched to the first graphic affordance, a moving direction, and whether the contact with the touch display is maintained, in operation 1330. For example, when a first function and a second function are matched to the first graphic affordance, the electronic device 101, 300 may execute any one of a detailed function matched to the second graphic affordance and a detailed function matched to a third graphic affordance based on a moving distance by a user interaction corresponding to each of the second graphic affordance corresponding to the first function and the third graphic affordance corresponding to the second function and whether the contact with the touch display is maintained.

Figure 14:
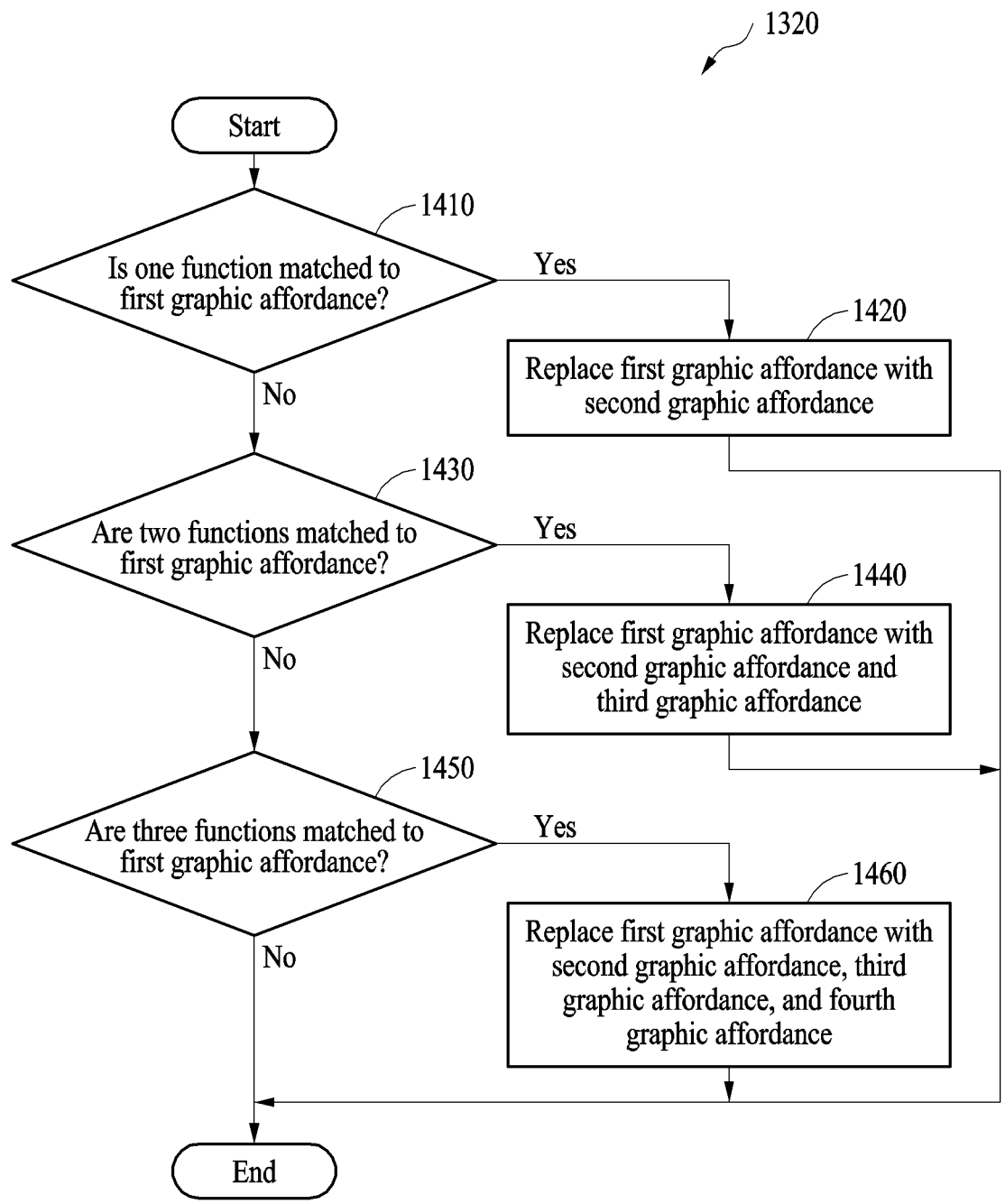
FIG. 14 is a flowchart illustrating an operating method of an electronic device according to an embodiment.

FIG. 14 is a flowchart illustrating an operating method of an electronic device according to another embodiment. Operations may be performed sequentially, but are not necessarily performed sequentially. For example, the operations may be performed in different orders, and at least two of the operations may be performed in parallel.

Referring to FIG. 14, an operation of replacing a first graphic affordance with as many graphic affordances as functions matched to the first graphic affordance through operations 1410 to 1460 by an electronic device (e.g., the electronic device 101 of FIG. 1, the electronic device 300 of FIG. 3) according to an embodiment is illustrated. According to embodiments, operations 1410 to 1460 may be performed by a processor (e.g., the processor 120 of FIG. 1, the processor 330 of FIG. 3), 300.

In operation 1410, the electronic device 101, 300 may determine whether one function is matched to a first graphic affordance. When it is determined in operation 1410 that one function is matched to the first graphic affordance, the electronic device 101, 300 may replace the first graphic affordance with a second graphic affordance, in operation 1420.

When it is determined in operation 1410 that not only one function is matched to the first graphic affordance, the electronic device 101, 300 may determine whether two functions are matched to the first graphic affordance, in operation 1430. When it is determined in operation 1430 that two functions are matched to the first graphic affordance, the electronic device 101 and 300 may replace the first graphic affordance with a second graphic affordance and a third graphic affordance that respectively correspond to the two functions, in operation 1440.

When it is determined in operation 1430 that not only two functions are matched to the first graphic affordance, the electronic device 101, 300 may determine whether three functions are matched to the first graphic affordance, in operation 1450. When it is determined in operation 1450 that three functions are matched to the first graphic affordance, the electronic device 101 and 300 may replace the first graphic affordance with a second graphic affordance, a third graphic affordance, and a fourth graphic affordance that respectively correspond to the three functions, in operation 1460.

Figure 15:
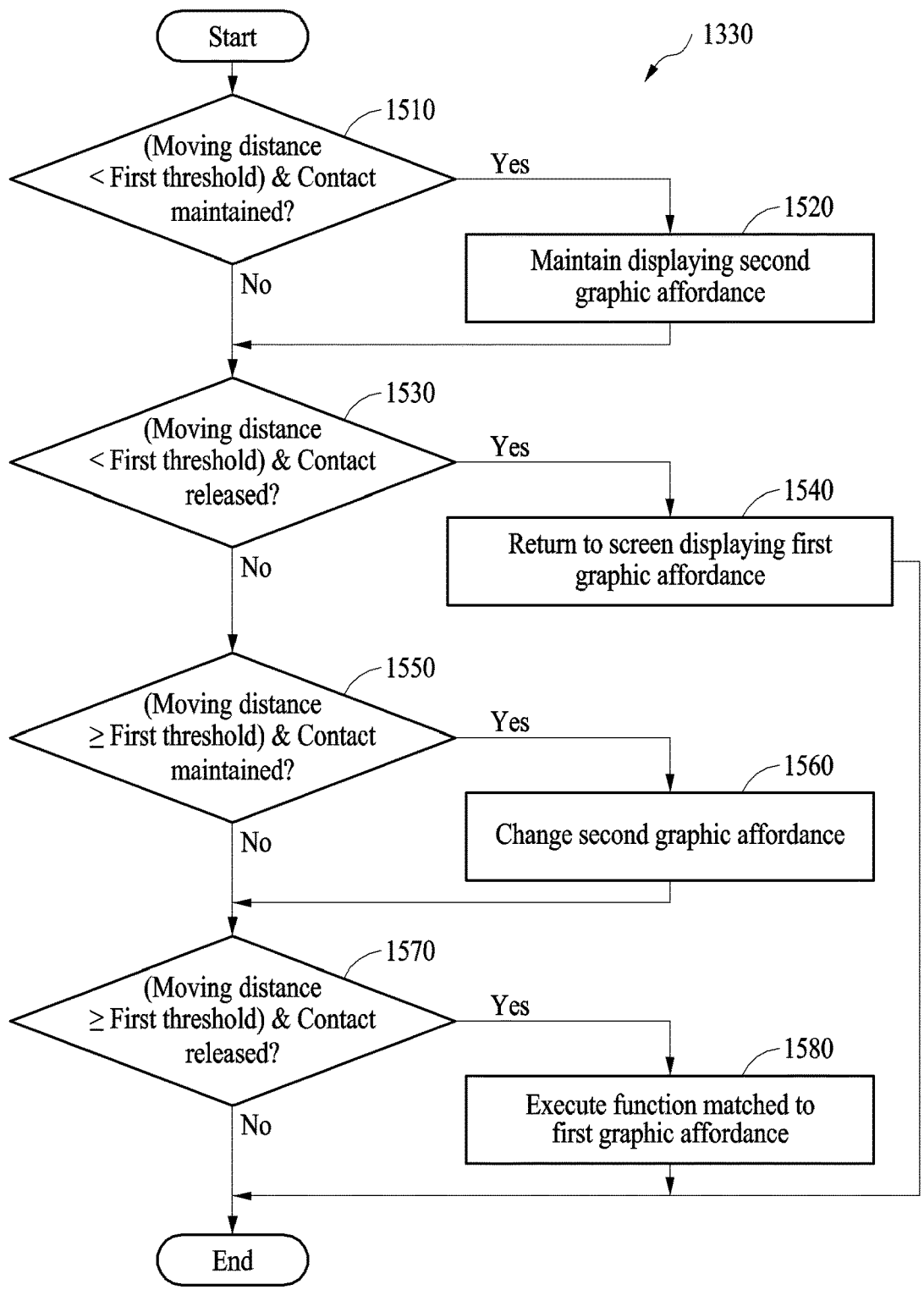
FIG. 15 is a flowchart illustrating an operating method of an electronic device according to an embodiment.

FIG. 15 is a flowchart illustrating an operating method of an electronic device according to another embodiment. Operations may be performed sequentially, but are not necessarily performed sequentially. For example, the operations may be performed in different orders, and at least two of the operations may be performed in parallel.

Referring to FIG. 15, an operation of performing a function matched to a first graphic affordance through operations 1510 to 1580 by an electronic device (e.g., the electronic device 101 of FIG. 1, the electronic device 300 of FIG. 3) according to an embodiment is illustrated. According to embodiments, operations 1510 to 1580 may be performed by a processor (e.g., the processor 120 of FIG. 1, the processor 330 of FIG. 3) of the electronic device 300.

In operation 1510, the electronic device 101, 300 may determine whether a moving distance by a user interaction corresponding to a second graphic affordance is less than a first threshold, and whether a contact with a touch display is maintained. When it is determined in operation 1510 that the moving distance is not less than the first threshold and that the contact is not maintained, the electronic device 101, 300 may perform operation 1530. Conversely, when it is determined in operation 1510 that the moving distance is less than the first threshold and that the contact is maintained, the electronic device 101, 300 may perform operation 1530, while maintaining displaying the second graphic affordance in operation 1520.

In operation 1530, the electronic device 101, 300 may determine whether the moving distance is less than the first threshold and whether the contact is released. When it is determined in operation 1530 that the moving distance is greater than the first threshold or that the contact is not released, the electronic device 101, 300 may immediately perform operation 1550. Conversely, when it is determined in operation 1530 that the moving distance is less than the first threshold and that the contact is released, the electronic device 101, 300 may return to a screen displaying the first graphic affordance without performing the function matched to the first graphic affordance, in operation 1540.

In operation 1550, the electronic device 101, 300 may determine whether the moving distance is greater than or equal to the first threshold, and whether the contact is maintained. When it is determined in operation 1550 that the moving distance is greater than or equal to the first threshold and that the contact is not maintained, the electronic device 101, 300 may immediately perform operation 1570. Conversely, when it is determined in operation 1550 that the moving distance is greater than or equal to the first threshold and that the contact is maintained, the electronic device 101, 300 may change the second graphic affordance in operation 1560 and then perform operation 1570. At this time, a method of changing the second graphic affordance by the electronic device 101, 300 in operation 1560 is as follows, but is not necessarily limited thereto.

In operation 1560, the electronic device 101, 300 may change the second graphic affordance by visually deforming the second graphic affordance. Here, visually deforming may include changing at least one of the shape, form, and color of the second graphic affordance, but is not necessarily limited thereto. For example, the electronic device 101, 300 may change the second graphic affordance by adding, to the second graphic affordance, at least one of an expression (e.g., "The flashlight will be turned on brightly.", "You can take a picture.") guiding the function matched to the first graphic affordance and an icon (e.g., a flashlight icon, a camera icon) guiding the function matched to the first graphic affordance. Alternatively, the electronic device 101, 300 may change the second graphic affordance by adding, to the second graphic affordance, an acoustic affordance including at least one of a sound and haptics related to the function matched to the first graphic affordance. In addition, for example, the electronic device 101, 300 may change the second graphic affordance by displaying a preview screen corresponding to the function matched to the first graphic affordance so as to be overlaid on the second graphic affordance.

In operation 1570, the electronic device 101, 300 may determine whether the moving distance is greater than or equal to the first threshold, and whether the contact is released. When it is determined in operation 1570 that the moving distance is greater than or equal to the first threshold and that the contact is not released, the electronic device 101, 300 may terminate the operation. Conversely, when it is determined in operation 1570 that the moving distance is greater than or equal to the first threshold and that the contact is released, the electronic device 101, 300 may execute the function matched to the first graphic affordance, in operation 1580.

According to an embodiment, when the moving distance is greater than or equal to the first threshold and the contact according to the user interaction is maintained in operation 1550, the electronic device 101, 300 may perform the function corresponding to the first graphic affordance for each step according to a degree to which the moving distance exceeds a second threshold, in addition to the changing of the second graphic affordance, in operation 1560.

While aspects of embodiments have been particularly shown and described, it will be understood that various changes in form and details may be made therein without departing from the spirit and scope of the following claims.

What is claimed is:

1. An electronic device, comprising:
 a touch display; and a processor configured to:
  control the touch display to display an icon associated with an application;
  control the touch display to display, based on an input on the icon, a first graphic affordance to indicate a first state of a function that the application provides;
  control to deform the first graphic affordance according to a moving distance of the input while the input is maintained;
  when the moving distance of the input exceeds a first threshold distance, control the touch display to replace the first graphic affordance with a second graphic affordance, wherein the second graphic affordance indicates that the first state of the function is able to be changed into a second state of the function of the application when the input is released while the second graphic affordance is displayed; and
  in response to detecting a release of the input, control a state of the function of the application to be one of the first state and the second state as being indicated by one of the first graphic affordance and the second graphic affordance when the input is released.

2. The electronic device of claim 1, wherein the processor is further configured to:
  control the touch display to maintain display of the first graphic affordance while the moving distance is less than the first threshold distance and the input is maintained;
  control the touch display to return to displaying the icon based on the moving distance being less than the first threshold distance and the input being released;
  control the touch display to change the first graphic affordance based on the moving distance being greater than or equal to the first threshold distance and the input being maintained; and
  execute the function matched to the second graphic affordance based on the moving distance being greater than or equal to the first threshold distance and the input being released.

3. The electronic device of claim 2, wherein the processor is further configured to control the touch display to change the first graphic affordance:
  by visually deforming the first graphic affordance;
  by adding, to the first graphic affordance, at least one of an expression and an icon guiding the first state of the function;
  by adding, to the first graphic affordance, an acoustic affordance comprising at least one of a sound and haptics related to the first state of the function; or
  by displaying a preview screen corresponding to the first state of the function or the second state of the function.

4. The electronic device of claim 1, wherein the processor is further configured to control the touch display to replace, based on a number of functions that the application provides with a single touch gesture on the icon of the application, the second graphic affordance with one or more graphic affordances corresponding to the functions excepting the function matched to the second graphic affordance, respectively.

5. The electronic device of claim 4, wherein the processor is further configured to:
  control the touch display to replace the second graphic affordance with a third graphic affordance that corresponds to a second function different from the function matched to the second graphic affordance, based on two functions being provided by the application; and
  control the touch display to replace the second graphic affordance with the third graphic affordance and a fourth graphic affordance that respectively correspond to three functions excepting the function matched to the second graphic affordance, based on the three functions being provided by the application with the single touch gesture on the icon of the application.

6. The electronic device of claim 4, wherein the processor is further configured to execute a detailed function matched to each of the one or more graphic affordances based on the moving distance, distances respectively corresponding to the one or more graphic affordances, a moving direction of the input, and whether the input is maintained.

7. The electronic device of claim 6, wherein the processor is further configured to execute, based on the function being matched to the second graphic affordance, a detailed function matched to a third graphic affordance based on the moving distance, the distances respectively corresponding to the second graphic affordance and the third graphic affordance, and whether the input is maintained.

8. An operating method of an electronic device, the operating method comprising:
  displaying an icon associated with an application;
  displaying, based on an input on the icon, a first graphic affordance to indicate a first state of a function that the application provides;
  deforming the first graphic affordance according to a moving distance of the input while the input is maintained;
  when the moving distance of the input exceeds a threshold distance, replacing the first graphic affordance with a second graphic affordance, wherein the second graphic affordance indicates that the first state of the function is able to be changed into a second state of the function of the application when the input is released while the second graphic affordance is displayed; and
  in response to detecting a release of the input, controlling a state of the function of the application to be one of the first state and the second state as being indicated by one of the first graphic affordance and the second graphic affordance when the input is released.

9. An electronic device, comprising:
  a touch display; and
  a processor configured to:
  control the touch display to display an icon associated with an application;
  control the touch display to display, based on an input on the icon, a first graphic affordance to indicate a first state of a first function that the application provides;
  control to deform the first graphic affordance according to a moving distance of the input while the input is maintained;
  when the moving distance of the input exceeds a first threshold distance, control the touch display to replace the first graphic affordance with a second graphic affordance, wherein the second graphic affordance indicates that the first state of the first function is able to be changed into a second state of the first function of the application when the input is released while the second graphic affordance is displayed;
  control to display the second graphic affordance and deform the second graphic affordance according to the moving distance of the input while the input is maintained;
  when the moving distance of the input exceeds a second threshold distance that is greater than the first threshold distance, control the touch display to replace the second graphic affordance with a third graphic affordance, wherein the third graphic affordance indicates that a first state of a second function of the application is able to be changed into a second state of the second function when the input is released while the third graphic affordance is displayed; and in response to detecting a release of the input, control a state of the first function or the second function of the application to be one as being indicated by one of the first graphic affordance, the second graphic affordance and the third graphic affordance when the input is released.

10. The electronic device of claim 9, wherein the processor is further configured to, based on the moving distance being greater than or equal to the first threshold distance and the input being maintained, perform the first function corresponding to the second graphic affordance while modifying the first function according to a degree to which the moving distance exceeds the first threshold distance, while continuing to control the touch display to change the second graphic affordance.

11. The electronic device of claim 10, wherein the processor is further configured to:

execute a detailed function as the second function matched to the third graphic affordance based on the moving distance corresponding to the third graphic affordance and exceeding the second threshold distance.

\* \* \* \* \*